(12) United States Patent
Zhao et al.

(10) Patent No.: US 12,491,464 B2
(45) Date of Patent: Dec. 9, 2025

(54) PROCESS FOR SEPARATING HYDROGEN FROM AN OLEFIN HYDROCARBON EFFLUENT VAPOR STREAM

(71) Applicant: EnFlex, Inc., Houston, TX (US)

(72) Inventors: James Zhao, Houston, TX (US); Shukui Zhao, Katy, TX (US)

(73) Assignee: Enflex, Inc., Houston, TX (US)

(*) Notice: Subject to any disclaimer, the term of this patent is extended or adjusted under 35 U.S.C. 154(b) by 664 days.

(21) Appl. No.: 17/966,314

(22) Filed: Oct. 14, 2022

(65) Prior Publication Data
US 2023/0050081 A1   Feb. 16, 2023

Related U.S. Application Data

(60) Continuation-in-part of application No. 17/377,895, filed on Jul. 16, 2021, now Pat. No. 12,111,104, (Continued)

(51) Int. Cl.
*B01D 53/00* (2006.01)

(52) U.S. Cl.
CPC ........ *B01D 53/002* (2013.01); *B01D 2202/00* (2013.01); *B01D 2256/24* (2013.01); *F25J 2200/02* (2013.01); *F25J 2205/04* (2013.01); *F25J 2210/04* (2013.01); *F25J 2210/12* (2013.01); *F25J 2210/62* (2013.01); *F25J 2215/02* (2013.01); *F25J 2215/04* (2013.01); *F25J 2215/10* (2013.01); *F25J 2215/64* (2013.01); *F25J 2230/08* (2013.01); *F25J 2230/20* (2013.01); *F25J 2230/30* (2013.01); (Continued)

(58) Field of Classification Search
CPC .............. B01D 53/002; B01D 2202/00; B01D 2256/24; F25J 2200/02; F25J 2205/04; F25J 2210/04; F25J 2210/12; F25J 2210/62; F25J 2215/02; F25J 2215/04; F25J 2215/10; F25J 2215/64; F25J 2230/08; F25J 2230/20; F25J 2230/30; F25J 2230/32; F25J 2230/60; F25J 2235/60; F25J 2240/04; F25J 2240/40; F25J 2245/02; F25J 2270/06; F25J 2270/904; F25J 2200/50; F25J 2215/62; F25J 3/0242; F25J 3/0252; F25J 3/0219; F25J 2200/30; F25J 2200/74; F25J 3/0238; F25J 2250/02; F25J 2270/12; F25J 2270/18; F25J 2270/60; F25J 2270/66; F25J 2290/40
See application file for complete search history.

(56) References Cited

U.S. PATENT DOCUMENTS 5,592,831 A   1/1997   Bauer et al.
5,651,270 A   7/1997   Low et al.
(Continued)

OTHER PUBLICATIONS

USPTO Non-Final Office Action for U.S. Appl. No. 15/600,758 dated Apr. 15, 2019.
(Continued)

*Primary Examiner* — Dung H Bui
(74) *Attorney, Agent, or Firm* — Eric M. Adams

(57) ABSTRACT

One or more specific embodiments disclosed herein includes a method for separating hydrogen from an olefin hydrocarbon rich compressed effluent vapor stream, employing a integrated heat exchanger, multiple gas-liquid separators, external refrigeration systems, and a rectifier attached to a liquid product drum.

16 Claims, 18 Drawing Sheets

Related U.S. Application Data which is a continuation-in-part of application No. 17/191,427, filed on Mar. 3, 2021, now Pat. No. 11,668,523, which is a continuation of application No. 17/191,373, filed on Mar. 3, 2021, now Pat. No. 11,674,748, which is a continuation-in-part of application No. 17/113,640, filed on Dec. 7, 2020, now Pat. No. 11,448,460, which is a division of application No. 15/988,601, filed on May 24, 2018, now Pat. No. 10,859,313, which is a continuation-in-part of application No. 15/600,758, filed on May 21, 2017, now Pat. No. 10,633,305.

(52) U.S. Cl.
CPC ........ *F25J 2230/32* (2013.01); *F25J 2230/60* (2013.01); *F25J 2235/60* (2013.01); *F25J 2240/04* (2013.01); *F25J 2240/40* (2013.01); *F25J 2245/02* (2013.01); *F25J 2270/06* (2013.01); *F25J 2270/904* (2013.01)

(56) References Cited

U.S. PATENT DOCUMENTS

| | | | |
|---|---|---|---|
| 6,253,574 B1 | 7/2001 | Stockmann et al. | |
| 6,333,445 B1 | 12/2001 | O'Brien | |
| 6,560,989 B1 | 5/2003 | Roberts et al. | |
| 7,219,513 B1 | 5/2007 | Mostafa | |
| 11,104,588 B1* | 8/2021 | Ahmed | B01D 5/0039 |
| 2011/0146342 A1 | 6/2011 | Sumner | |
| 2013/0340473 A1* | 12/2013 | Gouriou | C10G 5/06 62/611 |
| 2021/0048244 A1* | 2/2021 | Temple | B01D 5/009 |
| 2021/0371760 A1* | 12/2021 | Huang | C07C 7/00 |
| 2022/0002515 A1* | 1/2022 | Seidametov | C10B 53/07 |
| 2022/0306553 A1* | 9/2022 | Oneal | F25J 3/0242 |
| 2022/0316798 A1* | 10/2022 | Cuellar | F25J 3/0219 |
| 2023/0194162 A1* | 6/2023 | Prasetiyo | F25J 3/0219 62/620 |
| 2023/0288137 A1* | 9/2023 | Bauer | F25J 3/0209 |
| 2023/0408191 A1* | 12/2023 | Vovard | F25J 1/004 |
| 2024/0019204 A1* | 1/2024 | Qurashi | F25J 1/0248 |
| 2024/0117722 A1* | 4/2024 | Zapadinski | B01D 53/002 |

OTHER PUBLICATIONS

USPTO Final Office Action for U.S. Appl. No. 15/600,758 dated Sep. 25, 2019.
USPTO Notice of Allowance for U.S. Appl. No. 15/600,758 dated Dec. 26, 2019.
USPTO Notice of Allowance for U.S. Appl. No. 15/600,758 dated Feb. 19, 2020.
USPTO Issue Notification for U.S. Appl. No. 15/600,758 dated Apr. 8, 2020.
USPTO Non-Final Office Action for U.S. Appl. No. 15/988,601 dated May 1, 2020.
USPTO Notice of Allowance for U.S. Appl. No. 15/988,601 dated Aug. 10, 2020.
USPTO Issue Notification for U.S. Appl. No. 15/988,601 dated Nov. 18, 2020.
USPTO Non-Final Office Action for U.S. Appl. No. 17/113,640 dated Jan. 25, 2022.
USPTO Notice of Allowance for U.S. Appl. No. 17/113,640 dated May 9, 2022.
USPTO Issue Notification for U.S. Appl. No. 17/113,640 dated Aug. 31, 2022.
USPTO Non-Final Office Action for U.S. Appl. No. 17/191,373 dated Aug. 2, 2022.
USPTO Non-Final Office Action for U.S. Appl. No. 17/191,427 dated Aug. 26, 2022.

* cited by examiner

PROCESS FOR SEPARATING HYDROGEN FROM AN OLEFIN HYDROCARBON EFFLUENT VAPOR STREAM

CROSS-REFERENCE TO RELATED APPLICATIONS

This application is a continuation-in-part of U.S. application Ser. No. 17/377,895 filed on Jul. 16, 2021, which is a continuation-in-part of U.S. application Ser. No. 17/191,427 filed on Mar. 3, 2021, which is a continuation of U.S. application Ser. No. 17/191,373 filed on Mar. 3, 2021, which is a continuation-in-part of U.S. application Ser. No. 17/113,640 filed on Dec. 7, 2020, which is a divisional of U.S. application Ser. No. 15/988,601 filed on May 24, 2018, which is a continuation-in-part of U.S. application Ser. No. 15/600,758 filed on May 21, 2017, the disclosures of which are herein incorporated by reference in their entirety.

STATEMENT REGARDING FEDERALLY SPONSORED RESEARCH OR DEVELOPMENT

Not applicable.

BACKGROUND

1. Field of Inventions

The field of this application and any resulting patent is processes and systems for separating hydrogen from an olefin hydrocarbon vapor stream.

2. Description of Related Art

Various processes and systems have been proposed and utilized for separating hydrogen from an olefin hydrogen rich compressed effluent vapor stream, including some of the processes and systems disclosed in the references appearing on the face of this patent. However, those processes and systems lack all the steps or features of the processes and systems covered by any patent claims below. As will be apparent to a person of ordinary skill in the art, any processes and systems covered by claims of the issued patent solve many of the problems that prior art processes and systems have failed to solve. Also, the processes and systems covered by at least some of the claims of this patent have benefits that could be surprising and unexpected to a person of ordinary skill in the art based on the prior art existing at the time of invention.

SUMMARY

One or more specific embodiments disclosed herein includes a process for the separation of hydrogen from an olefin hydrocarbon rich compressed effluent vapor stream from a dehydrogenation unit, comprising cooling a compressed effluent vapor stream in a heat exchanger; separating hydrogen from olefin and heavy paraffinic components in the cooled compressed effluent vapor stream in a first separator to provide a first vapor stream and a first liquid stream; cooling the first vapor stream in the heat exchanger; separating hydrogen from olefin and heavy paraffinic components in the cooled first vapor stream in a second separator to provide a second vapor stream and a second liquid stream; warming the second vapor stream in the heat exchanger; isentropically expanding, in a high-pressure expander, the second vapor stream, wherein the pressure and temperature of the second vapor stream are lowered; warming the second vapor stream in the heat exchanger; compressing, in a high-pressure compressor, the second vapor stream; cooling the second vapor stream in a first discharge cooler; dividing the second vapor stream into a gas product and a split stream; withdrawing the gas product; compressing, in a low-pressure compressor, the split stream; cooling the split stream in a second discharge cooler and further cooling the split stream in the heat exchanger; isentropically expanding, in a low-pressure expander, the split stream, wherein the pressure and temperature of the split stream are lowered; cooling a liquid paraffinic stream in the heat exchanger; combining the cooled liquid paraffinic stream with the expanded split stream to provide a combined feed; vaporizing the combined feed in the heat exchanger; withdrawing the vaporized combined feed; lowering the pressure of the first liquid stream in a control valve; partially vaporizing the first liquid stream in the heat exchanger; flashing the partially vaporized first liquid stream in a liquid product drum to provide a hydrogen-rich gas, which travels to a rectifier connected to the liquid product drum; combining the hydrogen-rich gas and the second liquid stream in the rectifier, further purifying the hydrogen-rich gas; warming the hydrogen-rich gas from the rectifier in the heat exchanger to provide a flashed vapor stream; pumping a third liquid stream from the liquid product drum to the heat exchanger, wherein it is warmed; and providing a liquid product.

One or more specific embodiments disclosed herein includes a process for the separation of hydrogen from an olefin hydrocarbon rich compressed effluent vapor stream from a dehydrogenation unit, comprising separating hydrogen from olefin and heavy paraffinic components in the compressed effluent vapor stream to provide a first vapor stream and a first liquid stream; separating hydrogen from olefin and heavy paraffinic components in the first vapor stream to provide a second vapor stream and a second liquid stream; expanding and compressing the second vapor stream; dividing the second vapor stream into a gas product and a split stream; compressing and expanding the split stream; lowering the pressure of the first liquid stream; partially vaporizing the first liquid stream; flashing the partially vaporized first liquid stream in a liquid product drum to provide a hydrogen-rich gas; and combining the hydrogen-rich gas and the second liquid stream in a rectifier.

One or more specific embodiments disclosed herein includes a process for the separation of hydrogen from an olefin hydrocarbon rich compressed effluent vapor stream from a dehydrogenation unit, comprising separating hydrogen from olefin and heavy paraffinic components in the compressed effluent vapor stream to provide a first vapor stream and a first liquid stream; separating hydrogen from olefin and heavy paraffinic components in the first vapor stream to provide a second vapor stream and a second liquid stream; isentropically expanding, in a high-pressure expander, the second vapor stream; compressing, in a high-pressure compressor, the second vapor stream; dividing the second vapor stream into a gas product and a split stream; compressing, in a low-pressure compressor, the split stream; and isentropically expanding, in a low-pressure expander, the split stream.

One or more specific embodiments disclosed herein includes a process for the separation of hydrogen from an olefin hydrocarbon rich compressed effluent vapor stream from a dehydrogenation unit, comprising cooling a compressed effluent vapor stream in a heat exchanger; separating hydrogen from olefin and heavy paraffinic components in the cooled compressed effluent vapor stream in a first separator to provide a first vapor stream and a first liquid stream; cooling the first vapor stream in the heat exchanger; separating hydrogen from olefin and heavy paraffinic components in the cooled first vapor stream in a second separator to provide a second vapor stream and a second liquid stream; warming the second vapor stream in the heat exchanger to provide a gas product.

One or more specific embodiments disclosed herein includes a process for the separation of hydrogen from an olefin hydrocarbon rich compressed effluent vapor stream from a dehydrogenation unit, comprising cooling a compressed effluent vapor stream in a heat exchanger; separating hydrogen from olefin and heavy paraffinic components in the cooled compressed effluent vapor stream in a first separator to provide a first vapor stream and a first liquid stream; cooling the first vapor stream in the heat exchanger; separating hydrogen from olefin and heavy paraffinic components in the cooled first vapor stream in a second separator to provide a second vapor stream and a second liquid stream; warming the second vapor stream in the heat exchanger to provide a gas product; lowering the pressure of the first liquid stream in a control valve; flashing the first liquid stream in a liquid product drum to provide a hydrogen-rich gas, which travels to a rectifier connected to the liquid product drum; dividing the second liquid stream into a first liquid split stream and a second liquid split stream; lowering the pressure of the first liquid split stream in a control valve; partially vaporizing the first liquid split stream in the heat exchanger; flashing the partially vaporized first liquid split stream in the liquid product drum to provide additional hydrogen-rich gas, which travels to the rectifier connected to the liquid product drum; combining the hydrogen-rich gas and the second liquid split stream in the rectifier, further purifying the hydrogen-rich gas; warming the purified hydrogen-rich gas from the rectifier in the heat exchanger to provide a flashed vapor stream; pumping a third liquid stream from the liquid product drum to the heat exchanger, wherein it is warmed to provide a liquid product; dividing a liquid paraffinic stream into a plurality of liquid paraffinic streams; lowering the pressure of each of the plurality of liquid paraffinic streams in respective control valves; introducing each of the plurality of liquid paraffinic streams into respective thermosiphon vessels to provide a plurality of vapor paraffinic streams and a plurality of secondary liquid paraffinic streams; circulating each of the plurality of secondary liquid paraffinic streams from the bottom of each thermosiphon vessel, through the heat exchanger, and back to each respective thermosiphon vessel as a plurality of two-phase paraffinic streams, wherein a vapor phase of each of the plurality of two-phase paraffinic streams combines with each of the plurality of vapor paraffinic streams, and wherein a liquid phase of each of the plurality of two-phase paraffinic streams combines with each of the plurality of secondary liquid paraffinic streams; heating each of the plurality of vapor paraffinic streams in the heat exchanger; and combining each of the plurality of heated vapor paraffinic streams to provide an alternative combined feed stream, wherein each of the plurality of heated vapor paraffinic streams are optionally compressed via a compressor prior to being combined.

DETAILED DESCRIPTION

1. Introduction

Figure 1:
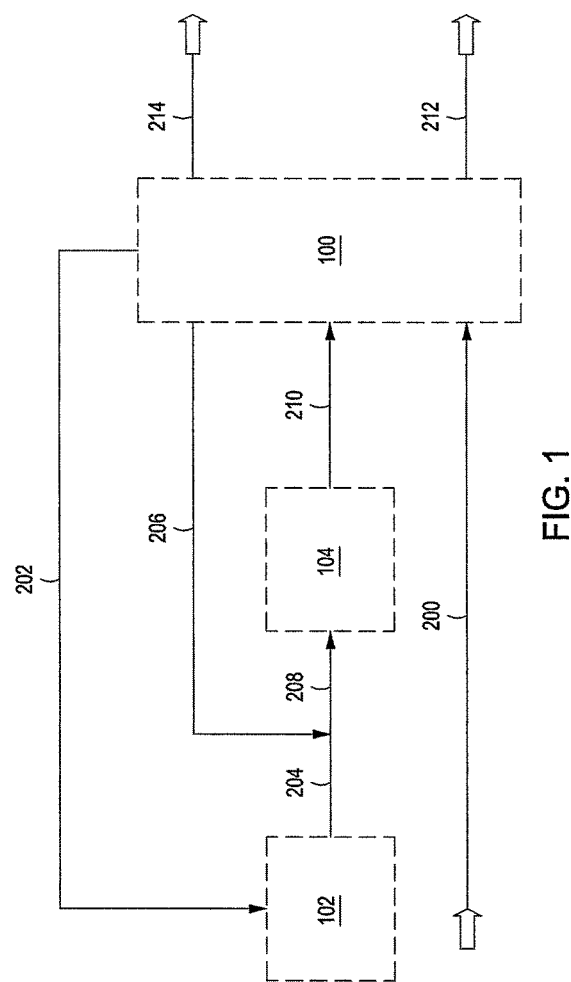
FIG. 1 is a schematic illustration, block flow diagram of a system for hydrogen separation shown as a part on and in an overall dehydrogenation system.

A detailed description will now be provided. The purpose of this detailed description, which includes the drawings, is to satisfy the statutory requirements of 35 U.S.C. § 112. For example, the detailed description includes a description of the inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details of the systems, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in any printed publication, dictionary, or issued patent.

2. Selected Definitions

Certain claims include one or more of the following terms which, as used herein, are expressly defined below.

The term "olefin hydrocarbon" as used herein is defined as an unsaturated hydrocarbon that contains at least one carbon-carbon double bond. The term "compressed effluent vapor stream" as used herein is defined as an olefin-hydrogen effluent gas stream from a feed compressor. In certain embodiments disclosed herein, a combined feed enters a dehydrogenation unit to create an effluent gas stream that contains hydrogen, olefins, and heavy hydrocarbon components. The effluent gas stream in these embodiments is a low-pressure effluent stream. An example of a dehydrogenation unit is OLEFLEX™, which is a brand name for a dehydrogenation unit (OLEFLEX™ is a trademark of UOP Inc. of Des Plaines, IL).

In certain embodiments disclosed herein, the compressed effluent vapor stream is referred to as a reactor effluent. Further, in certain embodiments, the reactor effluent enters a process for hydrogen separation at 35° C.-52° C. and 0.5-1.2 MPa(g).

The term "compressor" as used herein is defined as a mechanical device that increases the pressure of a gas by reducing its volume. In certain embodiments disclosed herein, the feed compressor is also referred to as the reactor effluent compressor unit.

The term "heat exchanger" as used herein is defined as a device that transfers or "exchanges" heat from one matter to another. In certain embodiments disclosed herein, the heat exchanger is referred to as the integrated main heat exchanger. Further, in certain embodiments disclosed herein, there may be more than one heat exchanger or only one heat exchanger. Also, in certain embodiments, the heat exchanger may be composed of brazed aluminum heat exchanger cores. In at least one specific embodiment disclosed herein, the integrated main heat exchanger has warm stream passes, and it has cold stream passes. Additionally, in certain embodiments with more than one heat exchanger, the heat exchangers may be configured in series or parallel.

The term "separator" as used herein is defined as a device used to separate hydrogen from olefin and heavy paraffinic components. In certain embodiments disclosed herein, gravity is used in a vertical vessel to cause liquid to settle to the bottom of the vessel, where the liquid is withdrawn. In the same embodiments, the gas part of the mixture travels through a gas outlet at the top of the vessel. Further, in certain embodiments disclosed herein, there is more than one separator employed. In certain embodiments disclosed herein, each separator results in a majority of the olefin and paraffinic components being condensed to liquid and the hydrogen remaining vapor. A "paraffin hydrocarbon" is a saturated hydrocarbon having a general formula $C_nH_{2n+2}$. For example, in one embodiment disclosed herein, an outlet stream enters a second separator and results in 99.8% vapor and 0.2% liquid.

The term "first vapor stream" as used herein is mainly hydrogen gas. In one specific embodiment disclosed herein, the first vapor stream is vapor stream from the first stage cold gas-liquid separator.

The term "first liquid stream" as used herein is composed of condensed olefin and paraffinic components. In certain embodiments disclosed herein, the first liquid stream is an olefin-rich liquid stream. Further, in certain embodiments disclosed herein, the first liquid stream is liquid stream from the first stage cold gas-liquid separator.

The term "second vapor stream" as used herein is composed of mainly hydrogen gas. In certain embodiments disclosed herein, the second vapor stream has a temperature of −115° C. Further, in certain embodiments disclosed herein, the second vapor stream is a vapor stream from the second stage cold gas-liquid separator.

The term "second liquid stream" as used herein is composed of olefin and paraffinic components in liquid form. In one specific embodiment disclosed herein, the second liquid stream is a liquid stream from the second stage cold gas-liquid separator.

The term "expander" as used herein is defined as a centrifugal or axial flow turbine through which a gas is isentropically expanded. In one specific embodiment disclosed herein, cryogenic temperatures are achieved from refrigeration by expanding a high-pressure effluent gas stream using two-stage expanders. The term "cryogenic" as used herein is an adjective which means being or related to very low temperatures. The term "refrigeration" as used herein is defined as the process of moving heat from one location to another in controlled conditions.

An example of one type of expander configuration is an expander/compressor configuration, which can be two independent expander/compressor sets. In this example of an expander/compressor configuration, the two sets may be either two separate magnetic bearing type expander/compressor sets or oil bearing type sets that share a common lube oil system. For the expander configuration with two separate expander/compressor sets, one set may be called a high-pressure expander/compressor set that is configured as "post-compression." Another set may be called a low-pressure expander/compressor set that is configured as "pre-compression." "Post-compression" means that the compressor is set to compress the gas stream after expansion. "Pre-compression" means that the compressor is set to compress the gas stream before expansion. In certain embodiments disclosed herein, the composition and mass flow of the stream to the high-pressure expander and the high-pressure compressor remain substantially unchanged.

Further, in the same embodiments, the composition and mass flow of the stream to the low-pressure expander and the low-pressure compressor remain substantially unchanged.

In other embodiments, a booster compressor may be added at the discharge of a high-pressure compressor. The term "booster compressor" as used herein refers to an additional compressor that provides additional pressure. In one specific embodiment disclosed herein, a booster compressor is added to achieve the required refrigeration for an effluent gas stream. Further, in the same embodiment, the booster compressor may be an independent compressor driven by either electrical motor or another type of driver. The term "motor" as used herein is defined as an electrical machine that converts electrical energy into mechanical energy.

In other embodiments, the high-pressure expander, the low-pressure expander, the high-pressure compressor, and the low-pressure compressor are mounted to a common bull gear to form a non-driver I-Compander. The term "bull gear" as used herein is defined as any large driving gear among smaller gears. In yet another embodiment, an electrical motor may be added to the bull gear to provide additional power for the compressor(s) to boost the pressure of a gas stream.

Another example of an expander configuration is an expander/electric generator configuration. The term "electric generator" as used herein is defined as a device that converts mechanical energy into electrical energy. In certain embodiments disclosed herein, there may be two separate expander/electric generator sets. Further, in those embodiments, the output power from the high-pressure expander drives its corresponding electric generator to produce electricity. Likewise, in those same embodiments, the output power from the low-pressure expander drives its corresponding electric generator to produce electricity.

The term "refrigerant compressor" as used herein refers to an additional compressor that provides additional pressure. In certain embodiments disclosed herein, an external refrigeration system comprising a single or multi-stage refrigerant compressor may be added to the separation system to provide the necessary refrigeration. In one specific embodiment disclosed herein, a refrigerant compressor may be added to the system to achieve the required refrigeration for an effluent gas stream. Further, in the same embodiment, the refrigerant compressor may be an independent compressor driven by either electrical motor or another type of driver. Further still, in the same embodiment, the refrigerant compressor system may include multiple stages of compression with a discharge cooler after each compressor stage and a discharge vapor/liquid separator after each discharge cooler.

The term "gas product" as used herein is defined as a hydrogen-rich gas product stream, which is sent to a downstream production facility. In one specific embodiment disclosed herein, the gas product is net gas product. In one example, the gas product contains primarily the hydrogen as well as the methane and ethane lighter hydrocarbons from the reactor effluent stream minus the material produced internally as recycle gas. In this example, the specifications for the gas product are as follows:

| PDH Unit | |
| --- | --- |
| Hydrogen, mole percent minimum | 92.5 |
| Total $C_{3+}$ olefins, mole % maximum | 0.055 |
| Temperature, C. | 36 |
| Pressure, MPa(g) | 0.60 |

The term "split stream" as used herein refers to a hydrogen-rich stream. In one specific embodiment disclosed herein, the split stream is a recycle gas. In one example, the recycle gas meets the following specifications:

| PDH Unit | |
| --- | --- |
| Hydrogen, mole percent minimum | 92.5 |
| Total Olefins, mole percent | 0.1 maximum |
| C3+ Olefins, mole percent | 0.05 maximum |

The term "liquid paraffinic stream" as used herein refers to a liquid hydrocarbon stream of primarily propane, isobutane, or a mixture of primarily both. Propane is a three-carbon alkane with the molecular formula $C_3H_8$. Isobutane is the simplest alkane with a tertiary carbon, and it has the molecular formula $C_4H_{10}$. In one specific embodiment disclosed herein, the liquid paraffinic stream is the fresh feed. In one example, the liquid paraffinic stream has a temperature of 52° C. and a pressure of 2.06 MPa(g).

The term "control valve" as used herein is defined as a valve used to control fluid flow by varying the size of the flow passage. In one specific embodiment disclosed herein, the control valve is used to lower the pressure of the fluid flow. The term "liquid product drum" as used herein is defined as a device used to separate a vapor-liquid mixture. In certain embodiments disclosed herein, a liquid product drum is attached to a rectifier. In these certain embodiments, the liquid product drum is used for flashing a partially vaporized liquid stream. The term "flashing" as used herein refers to "flash evaporation," which is defined as the partial vapor that occurs when a saturated liquid stream undergoes a reduction in pressure by passing through a throttling valve or other throttling device. In one example, the temperature of the liquid product drum is maintained at around 0° C. so that the liquid product drum may be composed of carbon steel.

In one specific embodiment, once in the liquid product drum, light components such as hydrogen, methane, and ethane, flash out from the liquid and travel upward through a rectifier located on top of the liquid product drum. The term "rectifier" as used herein is defined as a packed column used for "rectification." In "rectification," vapor and liquid are passed countercurrent to one another through a special apparatus, sometimes known as a rectifier, in which there are multiple points of contact between the two phases. The countercurrent movement is accompanied by heat and mass exchanges. In one example, the rectifier is a hollow vertical cylinder, within which there are irregularly shaped materials, known collectively as packing. The packing is used to enlarge the vapor-liquid interface.

The term "final liquid product" as used herein refers to an olefin-rich liquid product stream. In one specific embodiment disclosed herein, the final liquid product is liquid product stream 307. In one example, the final liquid product contains primarily the propylene and heavier hydrocarbons from a reactor effluent stream, meeting the following specifications:

| Propane + propylene recovery, % | 99.9 |
| --- | --- |
| Temperature, C. | 50 ± 5° C. |
| Pressure, MPa(g) | 4.0 |

The "flashed vapor stream" is the vapor from the liquid product drum. In certain embodiments disclosed herein, the flashed vapor stream may be recycled back to the reactor effluent compressor unit for recovery of any hydrocarbons in the flashed vapor stream.

The term "coldbox" as used herein is defined as a box designed to contain low-temperature and cryogenic equipment and parts. In certain embodiments disclosed herein, the coldbox is filled with insulation material and purged with nitrogen to provide cold insulation. In certain embodiments, the coldbox may contain the heat exchanger, the separators, the liquid product drum and rectifier, as well as the associated piping. In the same embodiments, control valves can either be enclosed within or installed outside of the coldbox.

3. Certain Specific Embodiments

Now, certain specific embodiments are described, which are by no means an exclusive description of the inventions. Other specific embodiments, including those referenced in the drawings, are encompassed by this application and any patent that issues therefrom.

One or more specific embodiments disclosed herein includes a process for the separation of hydrogen from an olefin hydrocarbon rich compressed effluent vapor stream from a dehydrogenation unit, comprising cooling a compressed effluent vapor stream in a heat exchanger; separating hydrogen from olefin and heavy paraffinic components in the cooled compressed effluent vapor stream in a first separator to provide a first vapor stream and a first liquid stream; cooling the first vapor stream in the heat exchanger; separating hydrogen from olefin and heavy paraffinic components in the cooled first vapor stream in a second separator to provide a second vapor stream and a second liquid stream; warming the second vapor stream in the heat exchanger; isentropically expanding, in a high-pressure expander, the second vapor stream, wherein the pressure and temperature of the second vapor stream are lowered; warming the second vapor stream in the heat exchanger; compressing, in a high-pressure compressor, the second vapor stream; cooling the second vapor stream in a first discharge cooler; dividing the second vapor stream into a gas product and a split stream; withdrawing the gas product; compressing, in a low-pressure compressor, the split stream; cooling the split stream in a second discharge cooler and further cooling the split stream in the heat exchanger; isentropically expanding, in a low-pressure expander, the split stream, wherein the pressure and temperature of the split stream are lowered; cooling a liquid paraffinic stream in the heat exchanger; combining the cooled liquid paraffinic stream with the expanded split stream to provide a combined feed; vaporizing the combined feed in the heat exchanger; withdrawing the vaporized combined feed; lowering the pressure of the first liquid stream in a control valve; partially vaporizing the first liquid stream in the heat exchanger; flashing the partially vaporized first liquid stream in a liquid product drum to provide a hydrogen-rich gas, which travels to a rectifier connected to the liquid product drum; combining the hydrogen-rich gas and the second liquid stream in the rectifier, further purifying the hydrogen-rich gas; warming the hydrogen-rich gas from the rectifier in the heat exchanger to provide a flashed vapor stream; pumping a third liquid stream from the liquid product drum to the heat exchanger, wherein it is warmed; and providing a liquid product.

One or more specific embodiments disclosed herein includes a process for the separation of hydrogen from an olefin hydrocarbon rich compressed effluent vapor stream from a dehydrogenation unit, comprising separating hydrogen from olefin and heavy paraffinic components in the compressed effluent vapor stream to provide a first vapor stream and a first liquid stream; separating hydrogen from olefin and heavy paraffinic components in the first vapor stream to provide a second vapor stream and a second liquid stream; expanding and compressing the second vapor stream; dividing the second vapor stream into a gas product and a split stream; compressing and expanding the split stream; lowering the pressure of the first liquid stream; partially vaporizing the first liquid stream; flashing the partially vaporized first liquid stream in a liquid product drum to provide a hydrogen-rich gas; and combining the hydrogen-rich gas and the second liquid stream in a rectifier.

One or more specific embodiments disclosed herein includes a process for the separation of hydrogen from an olefin hydrocarbon rich compressed effluent vapor stream from a dehydrogenation unit, comprising separating hydrogen from olefin and heavy paraffinic components in the compressed effluent vapor stream to provide a first vapor stream and a first liquid stream; separating hydrogen from olefin and heavy paraffinic components in the first vapor stream to provide a second vapor stream and a second liquid stream; isentropically expanding, in a high-pressure expander, the second vapor stream; compressing, in a high-pressure compressor, the second vapor stream; dividing the second vapor stream into a gas product and a split stream; compressing, in a low-pressure compressor, the split stream; and isentropically expanding, in a low-pressure expander, the split stream.

One or more specific embodiments disclosed herein includes a process for the separation of hydrogen from an olefin hydrocarbon rich compressed effluent vapor stream from a dehydrogenation unit, comprising cooling the compressed effluent vapor stream in a heat exchanger; separating hydrogen from olefin and heavy paraffinic components in the cooled compressed effluent vapor stream to provide a first vapor stream and a first liquid stream; cooling the first vapor stream in the heat exchanger; separating hydrogen from olefin and heavy paraffinic components in the cooled first vapor stream to provide a second vapor stream and a second liquid stream; warming the second vapor stream in the heat exchanger; expanding the second vapor stream; warming the second vapor stream in the heat exchanger; compressing the second vapor stream; dividing the second vapor stream into a gas product and a split stream; compressing the split stream; cooling the split stream in the heat exchanger; expanding the split stream; cooling a liquid paraffinic stream in the heat exchanger; combining the cooled liquid paraffinic stream with the expanded split stream to provide a combined feed; vaporizing the combined feed in the heat exchanger; partially vaporizing the first liquid stream in the heat exchanger; flashing the partially vaporized first liquid stream in a liquid product drum to provide a hydrogen-rich gas; warming the hydrogen-rich gas in the heat exchanger to provide a flashed vapor stream; and pumping a third liquid stream from the liquid product drum to the heat exchanger, wherein it is warmed.

In any one of the processes or systems disclosed herein, the heat exchanger may be a single heat exchanger.

In any one of the processes or systems disclosed herein, the heat exchanger may be comprised of one or more brazed aluminum heat exchanger cores.

In any one of the processes or systems disclosed herein, the compressed effluent vapor stream may be comprised of hydrogen, paraffinic hydrocarbons, and propylene or isobutylene.

In any one of the processes or systems disclosed herein, the compressed effluent vapor stream may be comprised of hydrogen, paraffinic hydrocarbons, and a mixture of propylene and isobutylene.

In any one of the processes or systems disclosed herein, the liquid paraffinic stream may be comprised of either propane, isobutane, or a combination of propane and isobutane.

In any one of the processes or systems disclosed herein, the process may be performed without the employment of external refrigeration.

In any one of the processes or systems disclosed herein, a booster compressor may be employed to provide additional pressure to the second vapor stream from the high-pressure compressor.

In any one of the processes or systems disclosed herein, the high-pressure expander, the low-pressure expander, the high-pressure compressor, and the low-pressure expander may be mounted to a bull gear.

In any one of the processes or systems disclosed herein, a motor may be employed to drive the bull gear.

In any one of the processes or systems disclosed herein, one or more electric generators may be driven by the power produced in the high-pressure expander, low-pressure expander, or both expanders.

In any one of the processes or systems disclosed herein, the high-pressure expander and the low-pressure expander may be configured in series.

In any one of the processes or systems disclosed herein, the high-pressure compressor and the low-pressure compressor may be configured into two or more stages in series.

In any one of the processes or systems disclosed herein, the high-pressure compressor may be driven by the power produced in the high-pressure expander.

In any one of the processes or systems disclosed herein, the low-pressure compressor may be driven by the power produced in the low-pressure expander.

In any one of the processes or systems disclosed herein, a coldbox may be employed to contain all low-temperature and cryogenic equipment and parts.

In any one of the processes or systems disclosed herein, the withdrawn combined feed may be employed as a feed stream to a dehydrogenation reactor.

In any one of the processes or systems disclosed herein, the withdrawn liquid product may be introduced into a product storage system.

In any one of the processes or systems disclosed herein, the flashed vapor stream may be recycled to a feed compressor.

In any one of the processes or systems disclosed herein, the liquid product drum may be maintained at a temperature such that the liquid product drum may be composed of carbon steel.

In any one of the processes or systems disclosed herein, the composition and mass flow of the second vapor stream to the high-pressure expander and the high-pressure compressor may remain substantially unchanged.

In any one of the processes or systems disclosed herein, the composition and mass flow of the split stream to the low-pressure expander and the low-pressure compressor may remain substantially unchanged.

In any one of the processes or systems disclosed herein, the high-pressure expander and high-pressure compressor set and the low-pressure expander and low-pressure compressor set may be magnetic bearing type expander/compressor sets.

In any one of the processes or systems disclosed herein, the high-pressure expander and high-pressure compressor set and the low-pressure expander and low-pressure compressor set may be oil bearing type sets that share a common lube oil system.

One or more specific embodiments disclosed herein includes a separation system which utilizes a process for the separation of hydrogen from an olefin hydrocarbon rich compressed effluent vapor stream from a dehydrogenation unit comprising a heat exchanger for cooling the compressed effluent vapor stream, cooling the first vapor product, warming the second vapor product, reheating the second vapor product, cooling the split stream, cooling a liquid paraffinic feed for use in the reactor, vaporizing the combined stream, partially vaporizing the first liquid product, warming the hydrogen-rich gas from the rectifier, and warming the flashed liquid stream from the liquid product drum; a first separator in which the cooled compressed effluent vapor stream is separated to provide a first vapor product and a first liquid product; a second separator in which the cooled first vapor product is separated to provide a second vapor product and a second liquid product; a high-pressure expander for isentropically expanding the second vapor product; a high-pressure compressor for compressing the second vapor product; a low-pressure compressor for compressing the split stream; a low-pressure expander for isentropically expanding the split stream; a rectifier for flashing the partially vaporized first liquid product to provide a hydrogen-rich gas and combining the hydrogen-rich gas with the second liquid product.

4. Specific Embodiments in the Figures

The drawings presented herein are for illustrative purposes only and are not intended to limit the scope of the claims. Rather, the drawings are intended to help enable one having ordinary skill in the art to make and use the claimed inventions.

Figure 2:
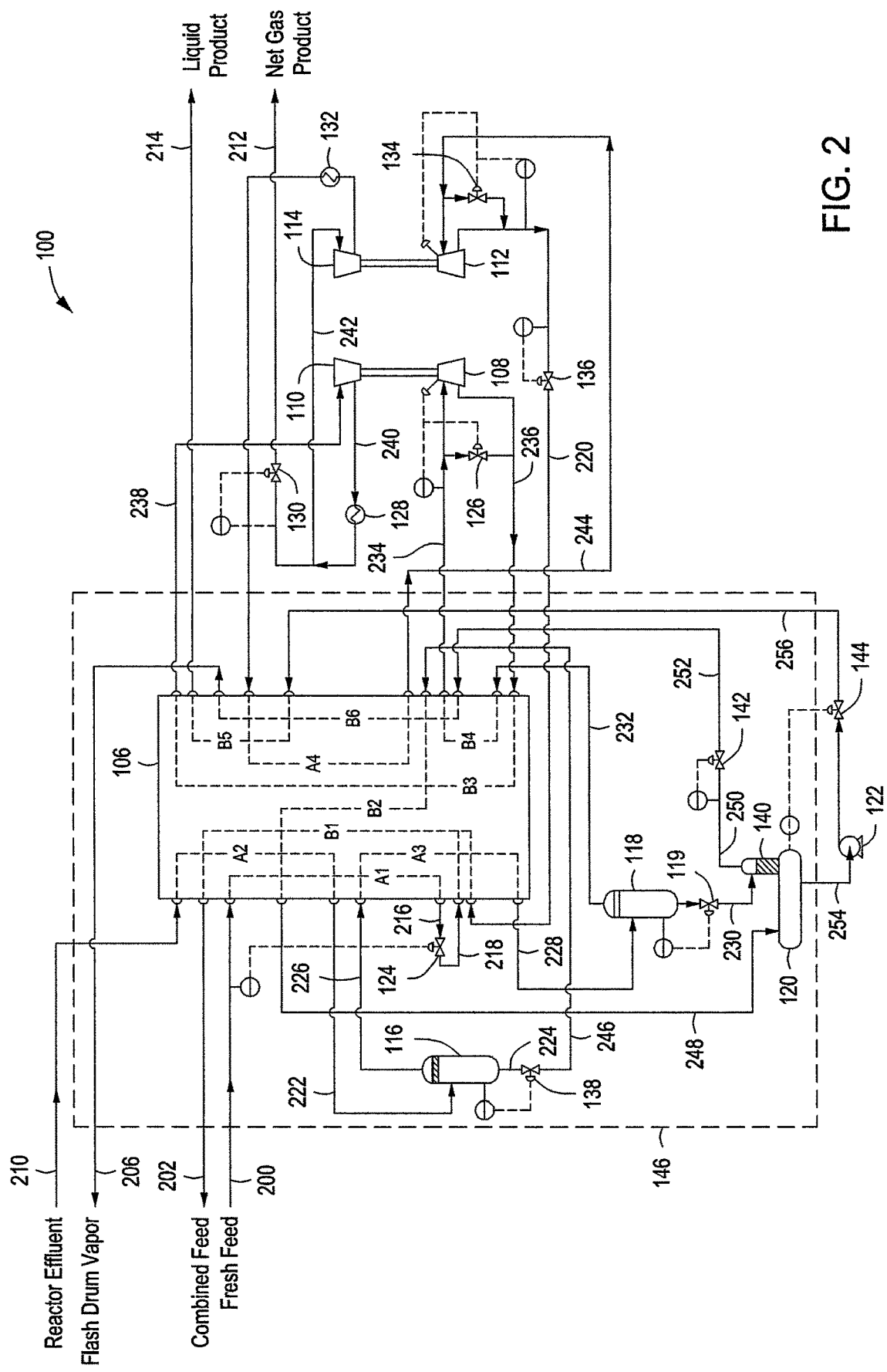
FIG. 2 is a schematic illustration, flow diagram of a system for hydrogen separation.
Figure 3:
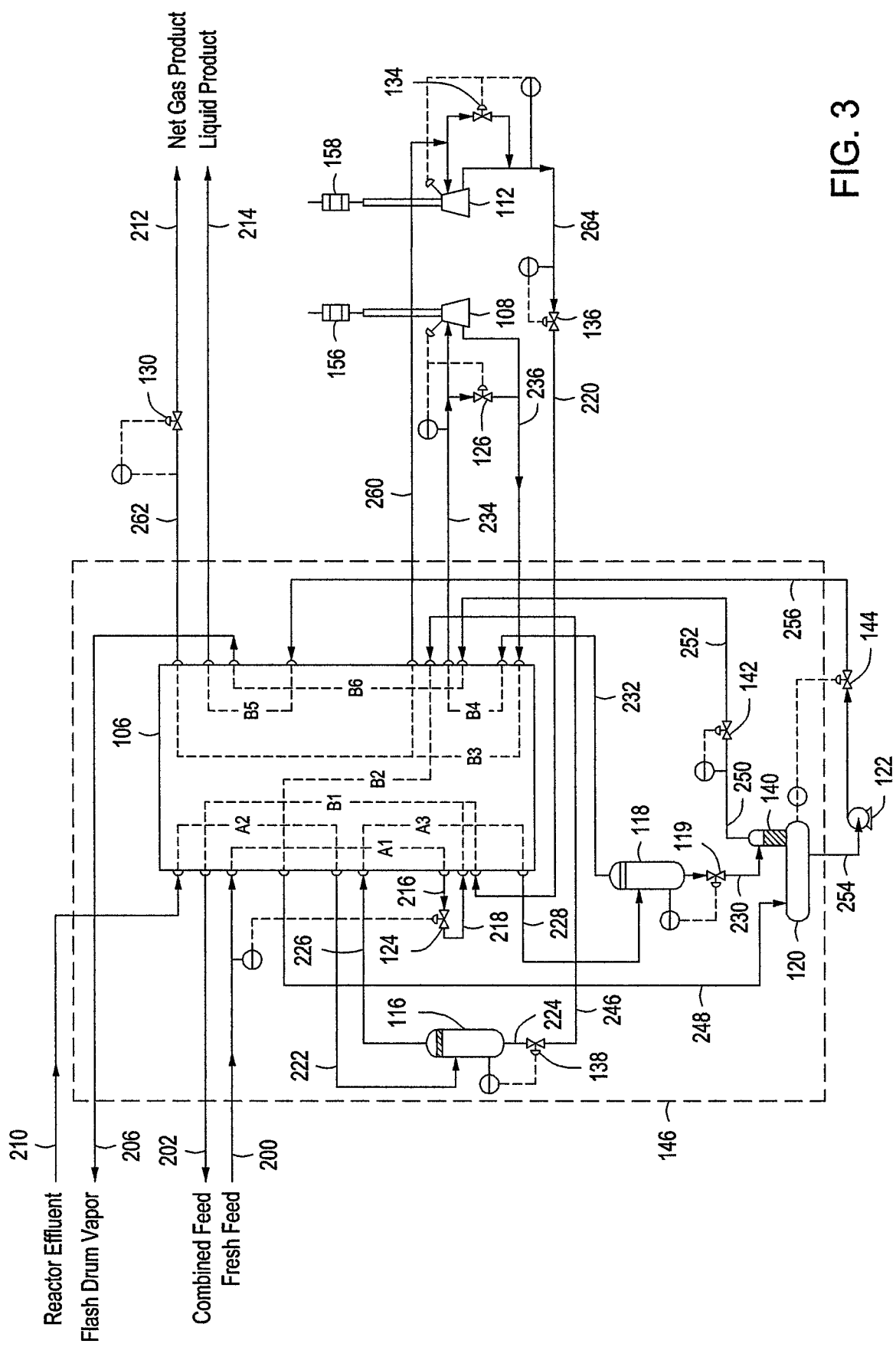
FIG. 3 is a schematic illustration, flow diagram of FIG. 2, but showing the optional use of an expander/electric generator system.

Referring to FIGS. 1-3, a specific embodiment, e.g., version or example, of a system for hydrogen separation from an olefin hydrocarbon rich compressed effluent vapor stream is illustrated. These figures may show features which may be found in various specific embodiments, including the embodiments shown in this specification and those not shown.

FIG. 1 shows a system for hydrogen separation, processing unit 100, with a dehydrogenation unit 102 and a reactor effluent compressor unit 104. A fresh feed 200 is a liquid paraffinic stream mainly composed of propane, isobutane, or a mixture of propane and isobutane. Fresh feed 200 is mixed with a recycle gas 220 (not shown), which is produced within the processing unit 100. Recycle gas 220 contains primarily hydrogen. The combination of fresh feed 200 and recycle gas 220 is vaporized within the processing unit 100 and emerges as a combined feed 202. The combined feed 202 enters the dehydrogenation unit 102, where the combined feed 202 is dehydrogenated resulting in an effluent gas stream 204. Effluent gas stream 204 is a low-pressure effluent stream composed of hydrogen, olefins, and other hydrocarbons. Effluent gas stream 204 is then mixed with a flash drum vapor 206, which is primarily hydrogen, to form a feed gas stream 208. The feed gas stream 208 enters the reactor effluent compressor unit 104, where the feed gas stream 208 has its pressure increased and then its temperature lowered before entering processing unit 100. A reactor effluent 210 exits the reactor effluent compressor unit 104 containing a mixture of hydrogen and hydrocarbons. There are two product streams produced from the processing unit 100. One is a hydrogen-rich gas product stream, referred to as a net gas product 212, and the other is an olefin-rich liquid product stream, referred to as a liquid product 214, which has a boosted pressure.

The processing unit 100 is a system design and flow system that can be connected to a propane dehydrogenation (PDH) unit, an isobutane dehydrogenation (BDH) unit, or a propane/isobutane dehydrogenation (PBDH) unit for hydrogen separation from the reactor effluent. The process conditions (temperature, pressure, composition) are different for PDH, BDH, and PBDH, but the basic process flow scheme may be the same. Illustrative process conditions at key points are listed in the tables below.

TABLE 1

An Example of Process Conditions of the Key Streams for a PDH Plant

| Stream No.<br>Stream Name | | 200<br>Fresh<br>Feed | 202<br>Combined<br>Feed | 204<br>Effluent<br>Gas<br>Stream | 206<br>Flash<br>Drum<br>Vapor | 210<br>Reactor<br>Effluent | 214<br>Liquid<br>Product | 212<br>Net Gas<br>Product |
|---|---|---|---|---|---|---|---|---|
| Pressure | kPa · G | 2200 | 350 | 5 | 5 | 1190 | 4000 | 590 |
| Temperature | ° C. | 52 | 37 | 43 | 37 | 43 | 49 | 43 |
| Hydrogen | Mole % | 0.0000 | H2/HCBN | 45.6105 | 70.9685 | 45.6936 | 0.0545 | 95.6074 |
| Methane | Mole % | 0.0000 | Ratio: | 2.6676 | 24.9248 | 2.7406 | 1.3315 | 4.1340 |
| Ethylene | Mole % | 0.0000 | 0.42-0.5 | 0.1062 | 0.1596 | 0.1064 | 0.1820 | 0.0230 |
| Ethane | Mole % | 0.7089 | | 2.0304 | 1.3530 | 2.0282 | 3.7273 | 0.1681 |
| Propylene | Mole % | 0.7793 | | 15.9163 | 1.0486 | 15.8676 | 30.3881 | 0.0339 |
| Propane | Mole % | 98.3613 | | 33.5518 | 1.5445 | 33.4469 | 64.0928 | 0.0336 |
| Propadiene | Mole % | 0.0000 | | 0.0024 | 0.0001 | 0.0024 | 0.0047 | 0.0000 |
| Methyl acetylene | Mole % | 0.0000 | | 0.0103 | 0.0004 | 0.0102 | 0.0196 | 0.0000 |
| Isobutane | Mole % | 0.1407 | | 0.0472 | 0.0003 | 0.0470 | 0.0902 | 0.0000 |
| Isobutylene | Mole % | 0.0065 | | 0.0263 | 0.0001 | 0.0262 | 0.0503 | 0.0000 |
| 1-butene | Mole % | 0.0000 | | 0.0006 | 0.0000 | 0.0006 | 0.0011 | 0.0000 |
| Normal butane | Mole % | 0.0034 | | 0.0002 | 0.0000 | 0.0002 | 0.0004 | 0.0000 |
| Cis-2-butene | Mole % | 0.0000 | | 0.0006 | 0.0000 | 0.0006 | 0.0011 | 0.0000 |
| Trans-2-butene | Mole % | 0.0000 | | 0.0007 | 0.0000 | 0.0007 | 0.0013 | 0.0000 |
| Benzene | Mole % | 0.0000 | | 0.0254 | 0.0000 | 0.0253 | 0.0485 | 0.0000 |
| Toluene | Mole % | 0.0000 | | 0.0034 | 0.0000 | 0.0034 | 0.0065 | 0.0000 |
| Xylene (as p-xylene) | Mole % | 0.0000 | | 0.0000 | 0.0000 | 0.0000 | 0.0000 | 0.0000 |
| Heavy hydrocarbons (as anthracene) | Mole % | 0.0000 | | 0.0000 | 0.0000 | 0.0000 | 0.0000 | 0.0000 |

Notes:
1. Liquid product 214 to have >99.9% C3 Recovery
2. Net gas product 212 to have Minimum H2 > 92.5%; Max Total Olefins < 0.1%; C3+ Olefins, <0.05%

TABLE 2

An Example of Process Conditions of the Key Streams for a BDH Plant

| Stream No.<br>Stream Name | | 200<br>Fresh<br>Feed | 202<br>Combined<br>Feed | 204<br>Effluent<br>Gas<br>Stream | 206<br>Flash<br>Drum<br>Vapor | 210<br>Reactor<br>Effluent | 214<br>Liquid<br>Product | 212<br>Net Gas<br>Product |
|---|---|---|---|---|---|---|---|---|
| Pressure | kPa · G | 783 | 350 | 7 | 7 | 599 | 906 | 481 |
| Temperature | ° C. | 49 | 37 | 43 | 35 | 39 | 47 | 39 |
| Hydrogen | Mole % | 0.0000 | H2/HCBN | 47.8013 | 72.8813 | 47.8426 | 0.0525 | 93.9978 |
| Methane | Mole % | 0.0000 | Ratio: | 2.8804 | 19.7952 | 2.9081 | 0.4244 | 5.2564 |
| Ethylene | Mole % | 0.0000 | 0.3-0.4 | 0.0041 | 0.0185 | 0.0041 | 0.0038 | 0.0043 |
| Ethane | Mole % | 0.0000 | | 0.1536 | 0.4872 | 0.1541 | 0.1980 | 0.1106 |
| Propylene | Mole % | 0.0000 | | 0.4072 | 0.2578 | 0.4069 | 0.7790 | 0.0474 |
| Propane | Mole % | 0.7046 | | 1.4840 | 0.8252 | 1.4829 | 2.8683 | 0.1446 |
| Propadiene | Mole % | 0.0000 | | 0.0000 | 0.0000 | 0.0000 | 0.0000 | 0.0000 |
| Methyl acetylene | Mole % | 0.0000 | | 0.0001 | 0.0000 | 0.0001 | 0.0002 | 0.0000 |
| Isobutane | Mole % | 97.5005 | | 26.1652 | 3.5254 | 26.1280 | 52.9086 | 0.2912 |
| Isobutylene | Mole % | 0.0018 | | 20.0619 | 2.1378 | 20.0324 | 40.6490 | 0.1441 |
| 1-butene | Mole % | 0.0000 | | 0.1178 | 0.0116 | 0.1177 | 0.2389 | 0.0007 |
| Normal butane | Mole % | 1.7931 | | 0.5800 | 0.0408 | 0.5792 | 1.1776 | 0.0019 |
| Cis-2-butene | Mole % | 0.0000 | | 0.1308 | 0.0075 | 0.1306 | 0.2657 | 0.0003 |
| Trans-2-butene | Mole % | 0.0000 | | 0.1875 | 0.0117 | 0.1872 | 0.3808 | 0.0005 |

TABLE 2-continued

An Example of Process Conditions of the Key Streams for a BDH Plant

| Stream No.<br>Stream Name | | 200<br>Fresh<br>Feed | 202<br>Combined<br>Feed | 204<br>Effluent<br>Gas<br>Stream | 206<br>Flash<br>Drum<br>Vapor | 210<br>Reactor<br>Effluent | 214<br>Liquid<br>Product | 212<br>Net Gas<br>Product |
|---|---|---|---|---|---|---|---|---|
| Benzene | Mole % | 0.0000 | | 0.0044 | 0.0000 | 0.0044 | 0.0089 | 0.0000 |
| Toluene | Mole % | 0.0000 | | 0.0044 | 0.0000 | 0.0044 | 0.0089 | 0.0000 |
| Xylene<br>(as p-xylene) | Mole % | 0.0000 | | 0.0174 | 0.0000 | 0.0174 | 0.0355 | 0.0000 |
| Heavy<br>hydrocarbons<br>(as<br>anthracene) | Mole % | 0.0000 | | 0.0000 | 0.0000 | 0.0000 | 0.0000 | 0.0000 |

Notes:
1. Liquid product 214 to have >90% C4 Recovery
2. Net gas product 212 to have Minimum H2 > 90%; Max C4+ Olefins < 0.03%

TABLE 3

An Example of Process Conditions of the Key Streams for a PBDH Plant

| Stream No.<br>Stream Name | | 200<br>Fresh<br>Feed | 202<br>Combined<br>Feed | 204<br>Effluent<br>Gas<br>Stream | 206<br>Flash<br>Drum<br>Vapor | 210<br>Reactor<br>Effluent | 214<br>Liquid<br>Product | 212<br>Net Gas<br>Product |
|---|---|---|---|---|---|---|---|---|
| Pressure | kPa · G | 1830 | 260 | 5 | 5 | 1070 | 4240 | 505 |
| Temperature | ° C. | 37 | 48 | 43 | 48 | 51 | 35 | 43 |
| Hydrogen | Mole % | 0.0000 | H2/HCBN | 45.9920 | 79.7057 | 46.0635 | 0.0497 | 96.6271 |
| Methane | Mole % | 0.0000 | Ratio: | 2.1818 | 18.8848 | 2.2172 | 1.1821 | 3.2835 |
| Ethylene | Mole % | 0.0000 | 0.3-0.4 | 0.0159 | 0.0192 | 0.0159 | 0.0274 | 0.0031 |
| Ethane | Mole% | 0.0013 | | 0.6943 | 0.3576 | 0.6936 | 1.2766 | 0.0526 |
| Propylene | Mole % | 0.4579 | | 6.1041 | 0.2484 | 6.0917 | 11.6320 | 0.0115 |
| Propane | Mole % | 56.0496 | | 23.3764 | 0.7083 | 23.3283 | 44.5664 | 0.0219 |
| Propadiene | Mole % | 0.0000 | | 0.0004 | 0.0000 | 0.0004 | 0.0008 | 0.0000 |
| Methyl<br>acetylene | Mole % | 0.0000 | | 0.0017 | 0.0000 | 0.0017 | 0.0033 | 0.0000 |
| Isobutane | Mole % | 42.6054 | | 11.4073 | 0.0468 | 11.3832 | 21.7572 | 0.0001 |
| Isobutylene | Mole % | 0.0207 | | 9.5945 | 0.0280 | 9.5742 | 18.2998 | 0.0001 |
| 1-butene | Mole % | 0.0000 | | 0.0739 | 0.0002 | 0.0737 | 0.1409 | 0.0000 |
| Normal<br>butane | Mole % | 0.8652 | | 0.3381 | 0.0006 | 0.3374 | 0.6449 | 0.0000 |
| Cis-2-butene | Mole % | 0.0000 | | 0.0806 | 0.0001 | 0.0804 | 0.1537 | 0.0000 |
| Trans-2-<br>butene | Mole % | 0.0000 | | 0.1165 | 0.0002 | 0.1163 | 0.2223 | 0.0000 |
| Benzene | Mole % | 0.0000 | | 0.0089 | 0.0000 | 0.0089 | 0.0169 | 0.0000 |
| Toluene | Mole % | 0.0000 | | 0.0022 | 0.0000 | 0.0022 | 0.0041 | 0.0000 |
| Xylene<br>(as p-xylene) | Mole % | 0.0000 | | 0.0095 | 0.0000 | 0.0095 | 0.0182 | 0.0000 |
| Heavy<br>hydrocarbons<br>(as<br>anthracene) | Mole % | 0.0000 | | 0.0019 | 0.0000 | 0.0019 | 0.0037 | 0.0000 |

Notes:
1. Liquid product 214 to have >95% C3 Recovery
2. Net gas product 212 to have Minimum H2 > 95%; Max Total Olefins < 0.1%; Max C3+ Olefins < 0.05%

FIG. 2 shows the detailed configuration of the processing unit 100 with an integrated main heat exchanger 106, two separate expander/compressor sets (108/110 and 112/114), a first stage cold gas-liquid separator 116, a second stage cold gas-liquid separator 118, a liquid product drum 120, and a liquid product pump 122. Based on different process conditions, the integrated main heat exchanger 106 may, in the alternative, be configured into two or more heat exchangers in series or parallel.

The two separate expander/compressor sets (108/110 and 112/114) may be two independent magnetic-bearing type or two sets of oil-bearing type that share a common lube oil system. Each expander/compressor set (108/110 and 112/114) may be configured into two or more stages in series setup depending on the pressure ratios of the expansion and compression, the flow rates, and other factors.

Fresh feed 200 enters warm pass A1 at the upper warm end of the integrated main heat exchanger 106 where the fresh feed 200 is cooled to a low temperature and exits pass A1 at the lower cold end of the integrated main heat exchanger 106 as an outlet stream 216. The pressure of the outlet stream 216 is then reduced by a flow control valve 124 to a pressure that meets the required pressure of combined feed 202, which feeds the dehydrogenation unit 102 (not shown).

Outlet stream 218 of flow control valve 124 then returns to the integrated main heat exchanger 106 via pass B1 where it mixes with recycle gas 220 from the discharge of the low-pressure expander 112. The mixed stream of recycle gas 220 and outlet stream 218 travels upward along the channel of pass B1, where heat exchanging occurs between the cold stream pass B1 and warm stream passes A1, A2, A3, and A4. Before exiting through pass B1, the mixed stream is completely vaporized and becomes a superheated vapor stream. The superheated vapor stream is referred to as combined feed 202 after exiting pass B1. The pressure of combined feed 202 is maintained at a constant value by the feed of the dehydrogenation unit 102 (not shown). The combined feed 202 is the reactor feedstock for dehydrogenation unit 102 (not shown).

The reactor effluent 210, an olefin-hydrogen effluent stream from the reactor effluent compressor unit 104 (not shown), enters pass A2 at the upper warm end of the integrated main heat exchanger 106, where the stream is cooled to a low temperature as it flows through and exits pass A2 in the middle of the integrated main heat exchanger 106. The cooling of the reactor effluent 210 as it travels through pass A2 is caused by cold stream passes B1 through B6. Outlet stream 222 from pass A2 enters the first stage cold gas-liquid separator 116 with a low temperature, at which time a majority, >95%, of the olefin and heavy paraffinic components in outlet stream 222 are condensed to liquid, which is separated out as liquid stream 224. Further, almost all, >99% of the hydrogen from outlet stream 222 remains vapor, and the first stage cold gas-liquid separator 116 separates out the vapor as vapor stream 226.

The vapor stream 226 then flows back to the integrated main heat exchanger 106 through pass A3, where it is cooled to a lower temperature by the time it exits pass A3 at the lower end of the integrated main heat exchanger 106. The outlet stream 228 from pass A3 enters the second stage cold gas-liquid separator 118, where almost all, >85%, of the olefin and heavy paraffinic components in outlet stream 228 are condensed to liquid stream 230 and almost all, >99.95% of the hydrogen stays in vapor stream 232. The vapor stream 232 exits second stage cold gas-liquid separator 118 and returns to the integrated main heat exchanger 106 through pass B4, where vapor stream 232 is warmed before exiting pass B4 of the integrated main heat exchanger 106 as outlet stream 234. Outlet stream 234 is superheated and enters the high-pressure expander 108, where it is expanded by "isentropic" gas expansion process to a lower pressure and lower temperature to become a cold stream 236. The output power from the high-pressure expander 108 drives high-pressure compressor 110. The high-pressure expander 108 is equipped with an IGV (inlet guide vane) and bypass control valve 126 to maintain a constant pressure at the inlet of high-pressure expander 108.

Cold stream 236 may or may not contain liquid. Cold stream 236 flows directly into pass B3 at the lower cold end of the integrated main heat exchanger 106 and travels up pass B3, where it exchanges heat with warm stream passes A1, A2, A3, and A4. As cold stream 236 travels through pass B3, it is warmed to a temperature close to the inlet temperatures of passes A1, A2, A3, and A4 by the time it exits pass B3 at the upper warm end of the integrated main heat exchanger 106. An outlet stream 238 from pass B3 then flows to high-pressure compressor 110, where the pressure of outlet stream 238 is increased to meet the pressure requirement of the net gas product 212. A discharge stream 240 from high-pressure compressor 110, which contains primarily hydrogen and other lighter hydrocarbons (e.g. methane and ethane) from the reactor effluent 210, is cooled down by a high-pressure compressor discharge cooler 128 before being split into two streams. One stream is the net gas product 212, which is sent to a downstream production facility. The pressure of the net gas product 212 determines the discharge pressure of the high-pressure compressor 110. A pressure control valve 130 maintains a minimum required discharge pressure of the high-pressure compressor 110 to protect the high-pressure compressor 110 in case the pressure of the net gas product 212 is lost.

The second stream from the discharge of the high-pressure compressor discharge cooler 128 is a split stream 242. Split stream 242 is routed to the low-pressure compressor 114 where its pressure is boosted. Split stream 242 is then cooled by a low-pressure compressor discharge cooler 132, before entering warm stream pass A4 at the upper warm end of the integrated main heat exchanger 106. Split stream 242 is cooled to a low temperature as it flows down and exits pass A4 at the middle of the integrated main heat exchanger 106. An outlet stream 244 of pass A4 then flows back to the low-pressure expander 112, where it is expanded to a lower pressure and lower temperature through "isentropic" gas expansion process. The output power from the low-pressure expander 112 drives low-pressure compressor 114. The low-pressure expander 112 discharge stream is recycle gas 220 that mixes with outlet stream 218 to become combined feed 202.

The low-pressure expander 112 is equipped with an IGV (inlet guide vane) and bypass control valve 134 to maintain a constant flow for recycle gas 220 to mix with outlet stream 218 in order to meet the $H_2$/hydrocarbon mole ratio specified for combined feed 202. The $H_2$/hydrocarbon mole ratio is defined as (moles of hydrogen in combined feed 202)/(moles of hydrocarbon in combined feed 202). This ratio is typically specified by the license of dehydrogenation reactors, for example the UOP's OLEFLEX™ dehydrogenation reactor.

The pressure of combined feed 202 determines the discharge pressure of the low-pressure expander 112. A pressure control valve 136 maintains a minimum required pressure of the low-pressure expander 112 to protect the low-pressure expander 112 from "flying out" in case the pressure of the combined feed 202 is lost.

Returning to the first stage cold gas-liquid separator 116, the pressure of the olefin-rich liquid stream 224 is reduced by level control valve 138 before it enters pass B2 of the integrated main heat exchanger 106 as cold stream 246. Cold stream 246 enters pass B2 at the lower cold end of the integrated main heat exchanger 106 where cold stream 246 exchanges heat with the warm passes A1, A2, and A4 and becomes partially vaporized. This partially vaporized stream 248 exits pass B2 in the middle of the integrated main heat exchanger 106 and flows to the liquid product drum 120. Once in the liquid product drum 120, light components, mainly hydrogen, methane, ethane, and maybe some C3+ components, flash out from the liquid and travel upward through the rectifier 140 located on the top of the liquid product drum 120. The upward travelling hydrogen-rich gas in the rectifier 140, which is a packed column, makes contact with the downward travelling colder liquid stream 230 from the second stage cold gas-liquid separator 118. Heat and mass transferring occurs in the rectifier 140, and therefore the hydrogen-rich gas in the rectifier 140 is further purified to meet the minimum hydrogen content specification of the flash drum vapor 206, before exiting the top of the rectifier 140 as a vapor stream 250.

The pressure of the liquid product drum 120 is maintained by a pressure control valve 142 on vapor stream 250 to a constant pressure to maximize the recovery of olefin and heavy hydrocarbon components in the liquid product 214 and to meet the specification of the maximum allowable hydrogen content in the liquid product 214.

After the pressure control valve 142, a cold stream 252 contains certain olefin components in addition to the main light components hydrogen, methane, and ethane. The cold stream 252 enters cold stream pass B6 at the lower cold end of the integrated main heat exchanger 106. As cold stream 252 travels up pass B6, it exchanges heat with the warm stream passes A1, A2, A3, and A4, and cold stream 252 is warmed to a temperature close to the inlet temperature of reactor effluent 210 or fresh feed 200 as it exits pass B6. The flash drum vapor 206 from pass B6 then flows back to the inlet of the reactor effluent compressor unit 104 (not shown).

The separated cold liquid stream 254 from the liquid product drum 120 is pumped by the liquid product pump 122 to a pressure that meets the required pressure of the liquid product 214. The liquid level of the liquid product drum 120 is maintained by a level control valve 144.

The cold liquid product stream 256 then enters pass B5 at the middle of the integrated main heat exchanger 106. As the liquid product stream 256 travels upward in pass B5, it exchanges heat with the warm passes A1, A2, and A4 and is warmed to a temperature defined by the liquid product 214 specification as it exits pass B5 at the upper warm end of the integrated main heat exchanger 106. The liquid product 214 is then sent to a production facility.

The liquid product drum 120 may be maintained at a temperature greater than −15° C., and therefore, liquid product drum 120 and liquid product pump 122 may be constructed of carbon steel for additional cost savings.

Liquid product drum 120 is elevated to a height to get enough NPSHa (net positive suction head available) for the liquid product pump 122 to avoid cavitation damage to the liquid product pump 122.

Further, a coldbox 146 is designed to contain all low-temperature equipment including the integrated main heat exchanger 106, the first stage cold gas-liquid separator 116, the second stage cold gas-liquid separator 118, and the liquid product drum 120, as well as the associated piping. Control valves 138, 119, 142, and 124 can either be enclosed within or installed outside of the coldbox 146. The coldbox 146 is typically filled with insulation material and purged with nitrogen to provide cold insulation for the low-temperature equipment and parts.

Figure 2A:
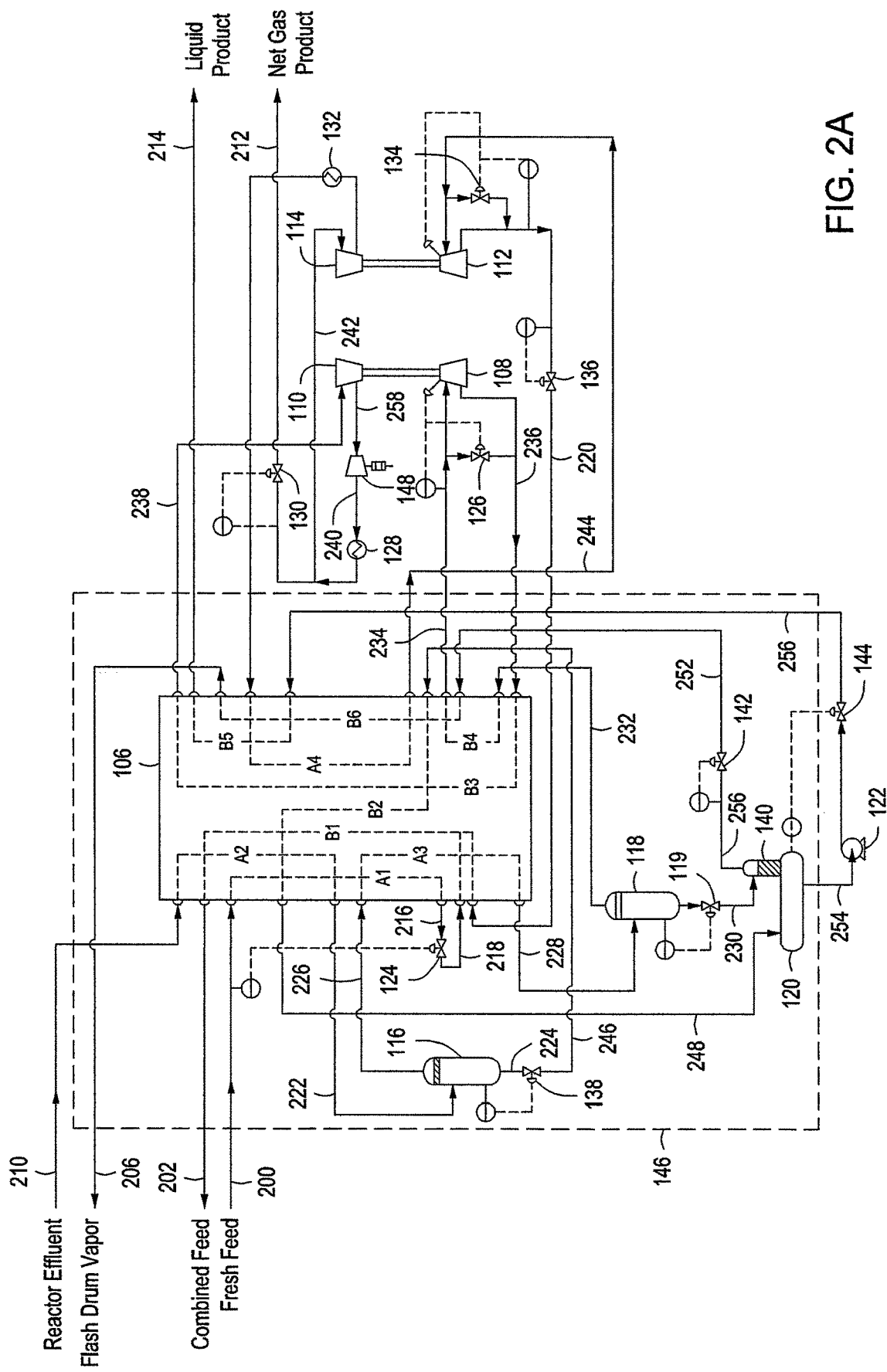
FIG. 2A is a schematic illustration, flow diagram of FIG. 2, but showing the optional use of a booster compressor.

FIG. 2A shows the option of two separate expander/compressor sets (108/110 and 112/114) with an additional booster compressor 148 located at the discharge of the high-pressure compressor 110. The only difference between FIG. 2 and FIG. 2A is the addition of the booster compressor 148, which is used to provide additional pressure to discharge stream 258 from high-pressure compressor 110. Further, booster compressor 148 achieves the required refrigeration for the effluent gas stream 204, especially when the pressure difference between the reactor effluent 210 and the net gas product 212 is not high enough to achieve the required refrigeration. The booster compressor 148 is an independent compressor driven by either electrical motor or other type of driver.

Figure 2B:
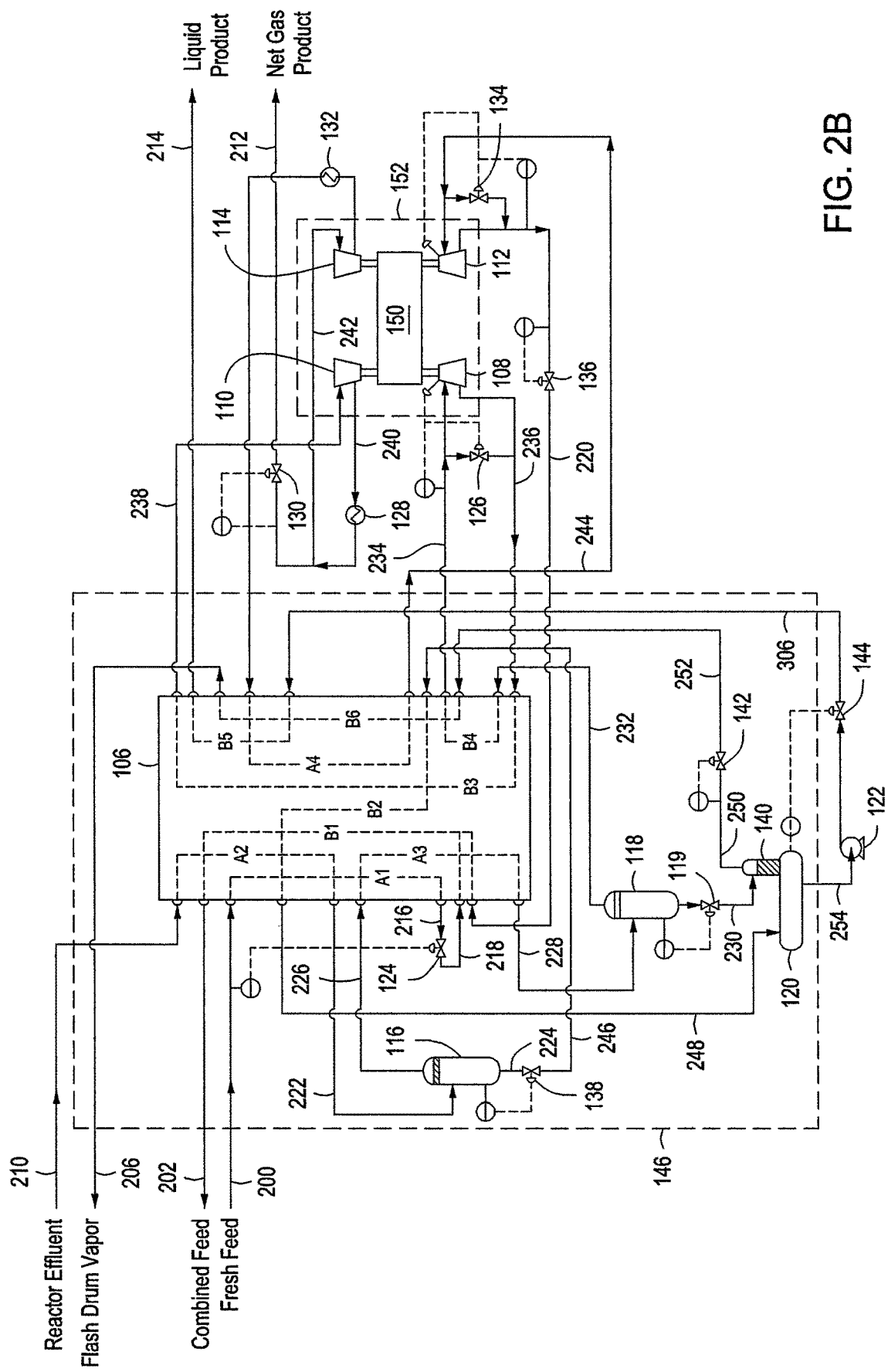
FIG. 2B is a schematic illustration, flow diagram of FIG. 2, but showing the optional use of a non-driver I-Compander.

FIG. 2B shows the non-driver I-Compander option. The only difference between FIG. 2 and FIG. 2B is that the high-pressure expander 108, the low-pressure expander 112, the high-pressure compressor 110, and the low-pressure compressor 114 are mounted to a common bull gear 150 to form a so called non-driver I-Compander 152. Depending on the pressure ratios of expansion, flow rate, and other factors, each expander may also be set up in series with multiple stages available. Each compressor can be configured into two or more stages in serial setup depending on the pressure ratios of the compression, the flow rate, and other factors.

Figure 2C:
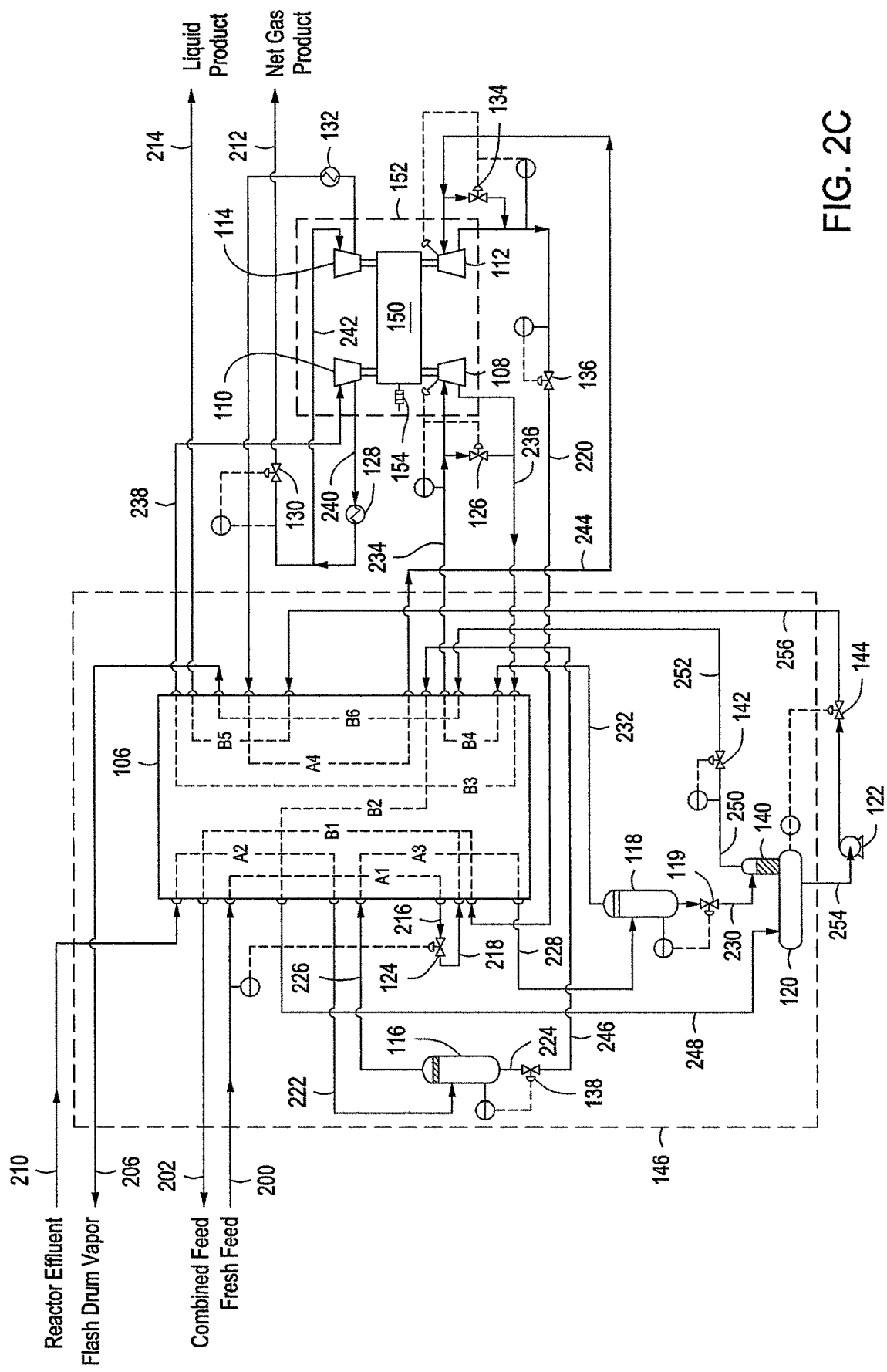
FIG. 2C is the schematic illustration, flow diagram of FIG. 2B, but showing the optional use of a motor-driver I-Compander.

FIG. 2C shows the motor-driver I-Compander option. The only difference between FIG. 2B and FIG. 2C is the addition of a motor driver, electric motor 154, to the bull gear 150 of the I-Compander 152. The power that drives the compressor(s) is from the high-pressure expander 108 and the low-pressure expander 112, with additional power input from the electric motor 154. The only difference between the "motor-driver option" and the "non-driver option" is the addition of the electric motor 154 that provides additional power for the compressor(s) to boost the pressure of discharge stream 240 and the pressure of outlet stream 244 high enough to provide the required refrigeration. The power input to the I-Compander 152 by the electric motor 154 is needed especially when the pressure difference between the reactor effluent 210 and the net gas product 212 is not high enough to achieve the required refrigeration.

Figure 2D:
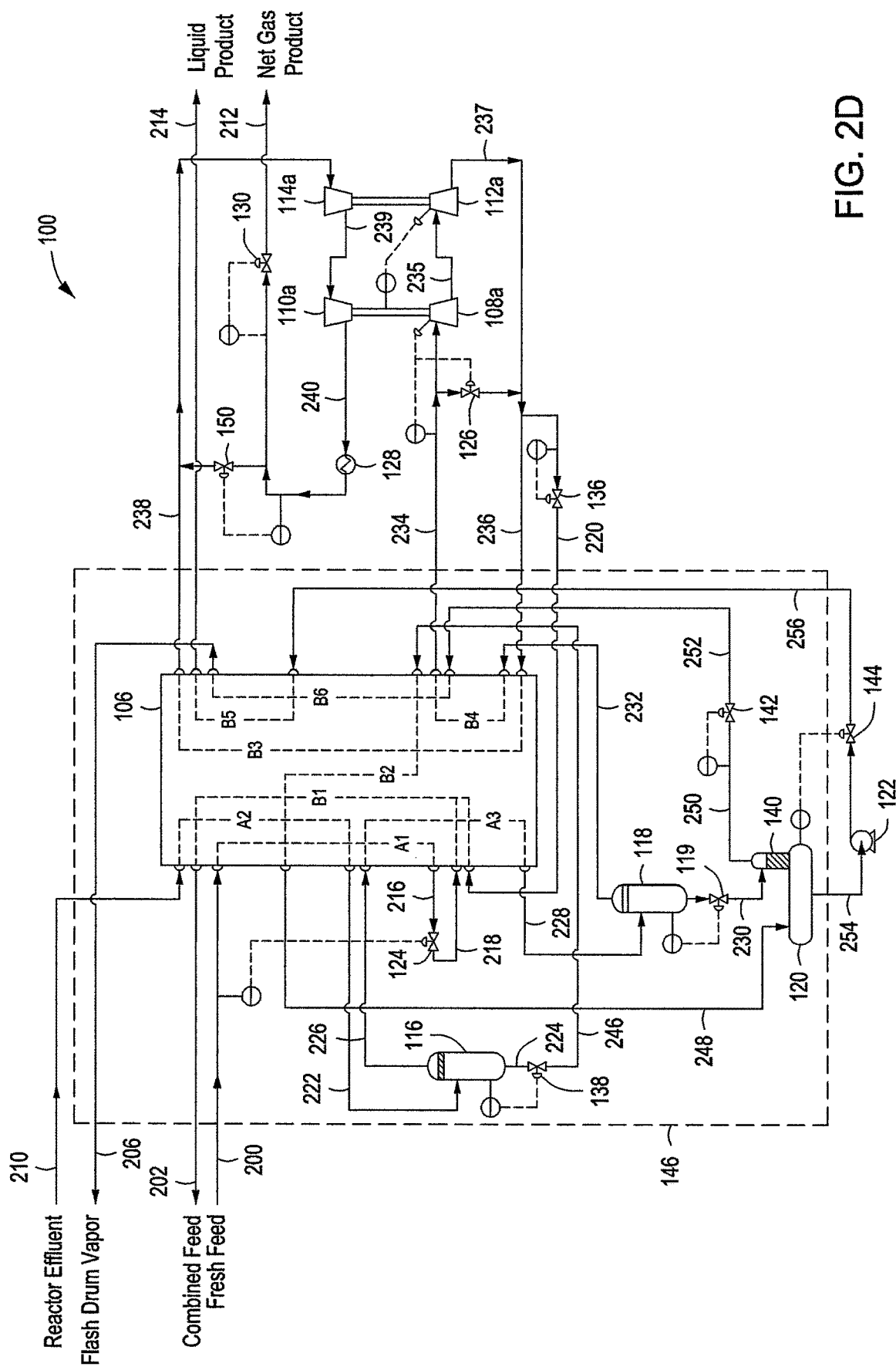
FIG. 2D is a schematic illustration, flow diagram showing a system for hydrogen separation using two separate expander/compressor sets in series.

FIG. 2D shows the option of two separate expander/compressor sets (108a/110a and 112a/114a) in series. In this embodiment, the two separate expander/compressor sets (108a/110a and 112a/114a) replace the high-pressure expander/compressor set (108/110), as shown in FIG. 2, and the low-pressure expander/compressor set (112/114) is eliminated. In this embodiment, outlet stream 234 is superheated and enters expander 108a, where it is expanded by "isentropic" gas expansion process to a lower pressure and lower temperature. Outlet stream 235 then enters expander 112a, where it is further expanded by "isentropic" gas expansion process to a lower pressure and lower temperature. The output power from expander 108a drives compressor 110a. Expander 108a is equipped with an IGV (inlet guide valve) and bypass control valve 126 to maintain a constant pressure at the inlet of expander 108a. Additionally, the output power from expander 112a drives compressor 114a.

As further illustrated in FIG. 2D, outlet stream 237 then splits into two separate streams. The first split stream from outlet stream 237 is cold stream 236. Cold stream 236 may or may not contain liquid. Cold stream 236 flows directly into pass B3 at the lower cold end of the integrated main heat exchanger 106 and travels up pass B3, where it exchanges heat with warm stream passes A1, A2, A3, and A4. As cold stream 236 travels through pass B3, it is warmed to a temperature close to the inlet temperatures of passes A1, A2, A3, and A4 by the time it exits pass B3 at the upper warm end of the integrated main heat exchanger 106. In this embodiment, an outlet stream 238 from pass B3 then flows to compressor 114a, where the pressure of outlet stream 238 is increased. Outlet stream 239 then enters compressor 110a, where the pressure of outlet stream 239 is increased to meet the pressure requirement of the net gas product 212. A discharge stream 240 from compressor 110a, which contains primarily hydrogen and other lighter hydrocarbons (e.g. methane and ethane) from the reactor effluent 210, is cooled down by a high-pressure discharge cooler 128, which then becomes net gas product 212, which is sent to a downstream production facility. The pressure of the net gas product 212 determines the discharge pressure of the compressor 110a. A pressure control valve 130 maintains a minimum required discharge pressure of the compressor 110a to protect the compressor 110a in case the pressure of the net gas product 212 is lost.

The second split stream from outlet stream 237 is recycle gas 220 that mixes with outlet stream 218 to become combined feed 202. The pressure of combined feed 202 determines the discharge pressure of expander 112a. A pressure control valve 136 maintains a minimum required pressure of the expander 112a to protect the expander 112a from "flying out" in case the pressure of the combined feed 202 is lost.

FIG. 3 shows the expander/electric-generator option of the processing unit 100 in FIG. 1. It illustrates configuration of the integrated main heat exchanger 106, two separate expander/electric-generator sets (108/156 and 112/158), the first stage cold gas-liquid separator 116, the second stage cold gas-liquid separator 118, the liquid product drum 120 and the liquid product pump 122. The differences between FIG. 3 and FIG. 2 include the configurations of the expander sets as well as the details identified below.

Stream 234 exits pass B4 of the integrated main heat exchanger 106 superheated and enters the high-pressure expander 108, where stream 234 is expanded to a lower pressure and lower temperature through a so-called "isentropic" gas expansion process. The output power from the high-pressure expander 108 drives electric generator 156 to produce electricity. The high-pressure expander 108 is equipped with an IGV (inlet guide vanes) and bypass control valve 126 to maintain a constant pressure at the expander inlet.

The cold outlet stream 236 from the high-pressure expander 108 may or may not contain liquid. It flows directly into pass B3 located at the lower cold end of the integrated main heat exchanger 106 and travels up in pass B3, where cold outlet stream 236 exchanges heat with the warm stream passes A1, A2, and A3. A side stream 260 is taken out from the middle of pass B3 as feed to the low-pressure expander 112.

The outlet stream 262 of pass B3 flows through pressure control valve 130 as net gas product 212 to a downstream production facility. The pressure of the net gas product 212 determines the discharge pressure of the high-pressure expander 108. The pressure control valve 130 is to maintain a minimum required discharge pressure of the high-pressure expander 108 to protect the expander from "flying out" in case the pressure of the net gas product stream is lost.

The side-stream 260 from pass B3 is routed to the low-pressure expander 112, where it is expanded to a lower pressure and lower temperature through "isentropic" gas expansion process. The output power from the low-pressure expander 112 drives electric generator 158 to produce electricity.

The low-pressure expander 112 is equipped with an IGV (inlet guide vanes) and bypass control valve 134 to maintain a constant flow for stream 264, which is the required hydrogen-rich recycle gas flow to mix with the liquid paraffinic stream 218 to meet the H2/HCBN mole ratio specification for the combined feed 202. The H2/HCBN mole ratio is defined as (moles of hydrogen in the combined feed 202)/(moles of hydrocarbon in combined feed 202). This ratio is typically specified by the license of dehydrogenation reactors, for example the UOP's OLEFLEX™ dehydrogenation reactor.

The pressure of the combined feed 202 determines the discharge pressure of the low-pressure expander 112. A pressure control valve 136 is installed to maintain a minimum required pressure of the low-pressure expander 112 to protect the expander from "flying out" in case the pressure of the combined feed 202 is lost. The stream 220 from pressure control valve 136 commingles with stream 218 as detailed in the description of FIG. 2. The stream 220 is the recycle gas stream that mixes with stream 218 to become the combined feed 202.

Figure 4:
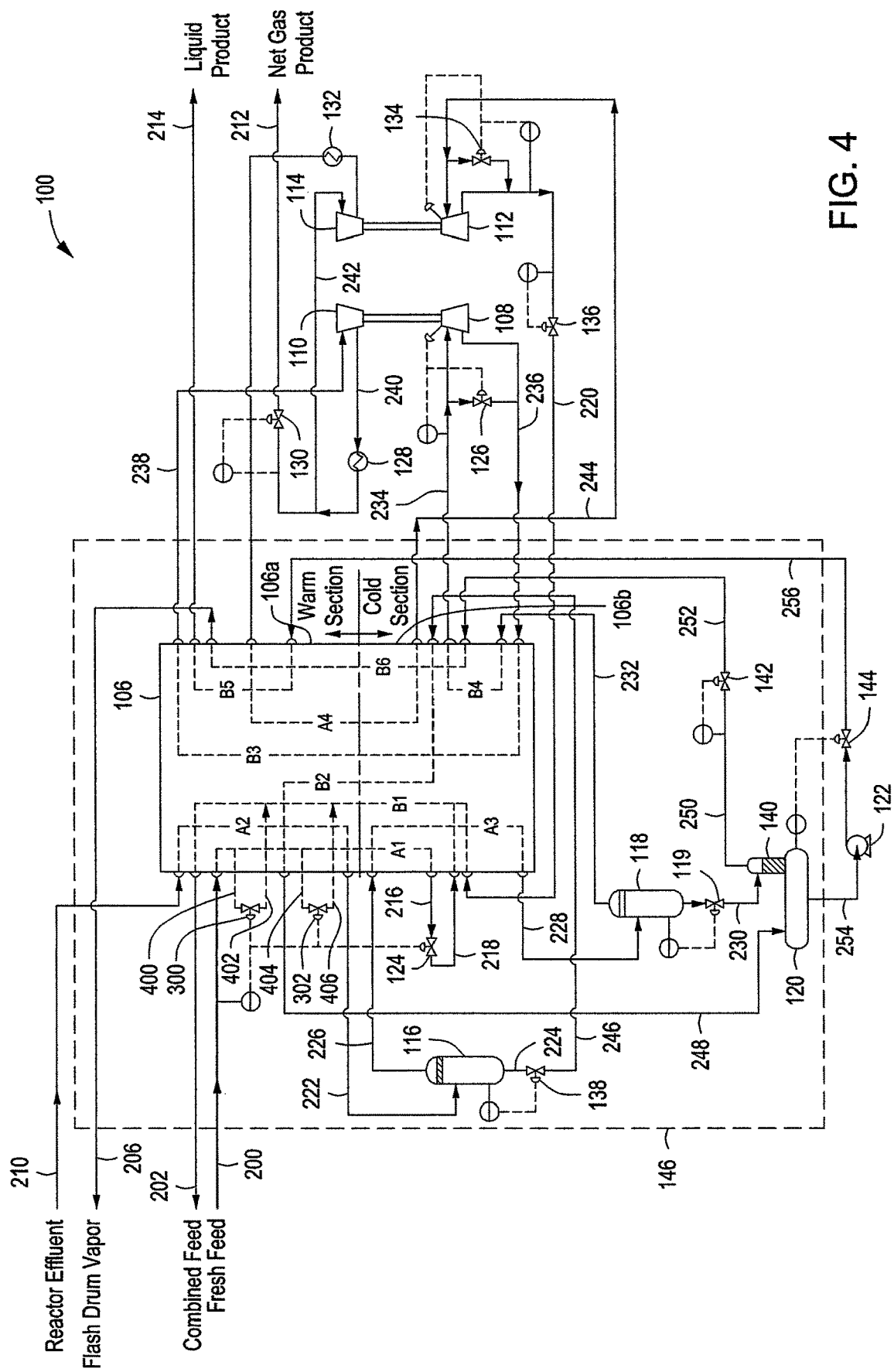
FIG. 4 is the schematic illustration, flow diagram of FIG. 2 with the alternative embodiment of the integrated main heat exchanger split into a warm section and a cold section.

Alternatively, certain embodiments may allow for the integrated main heat exchanger 106 to be split into a warm section 106a and a cold section 106b as shown in FIG. 4. FIG. 4 is the schematic illustration, flow diagram of FIG. 2 with the alternative embodiment of the integrated main heat exchanger 106 split into the warm section 106a and the cold section 106b. The warm section 106a and the cold section 106b can be composited of one or more brazed aluminum heat exchanger (BAHX) cores. As shown in FIG. 4, a side stream 400 is taken from warm pass A1 at a point at the upper end of the warm section 106a. The flow of side stream 400 is regulated by a control valve 300. The outlet stream 402 from control valve 300 then flows into pass B1 at the lower end of the warm section 106a. Further, as shown in FIG. 4, another side stream 404 is taken from warm pass A1 at a point at the lower end of the warm section 106a. The flow of side stream 404 is regulated by a control valve 302. The outlet stream 406 from control valve 302 then flows into pass B1 lower in the warm section 106a.

Figure 5:
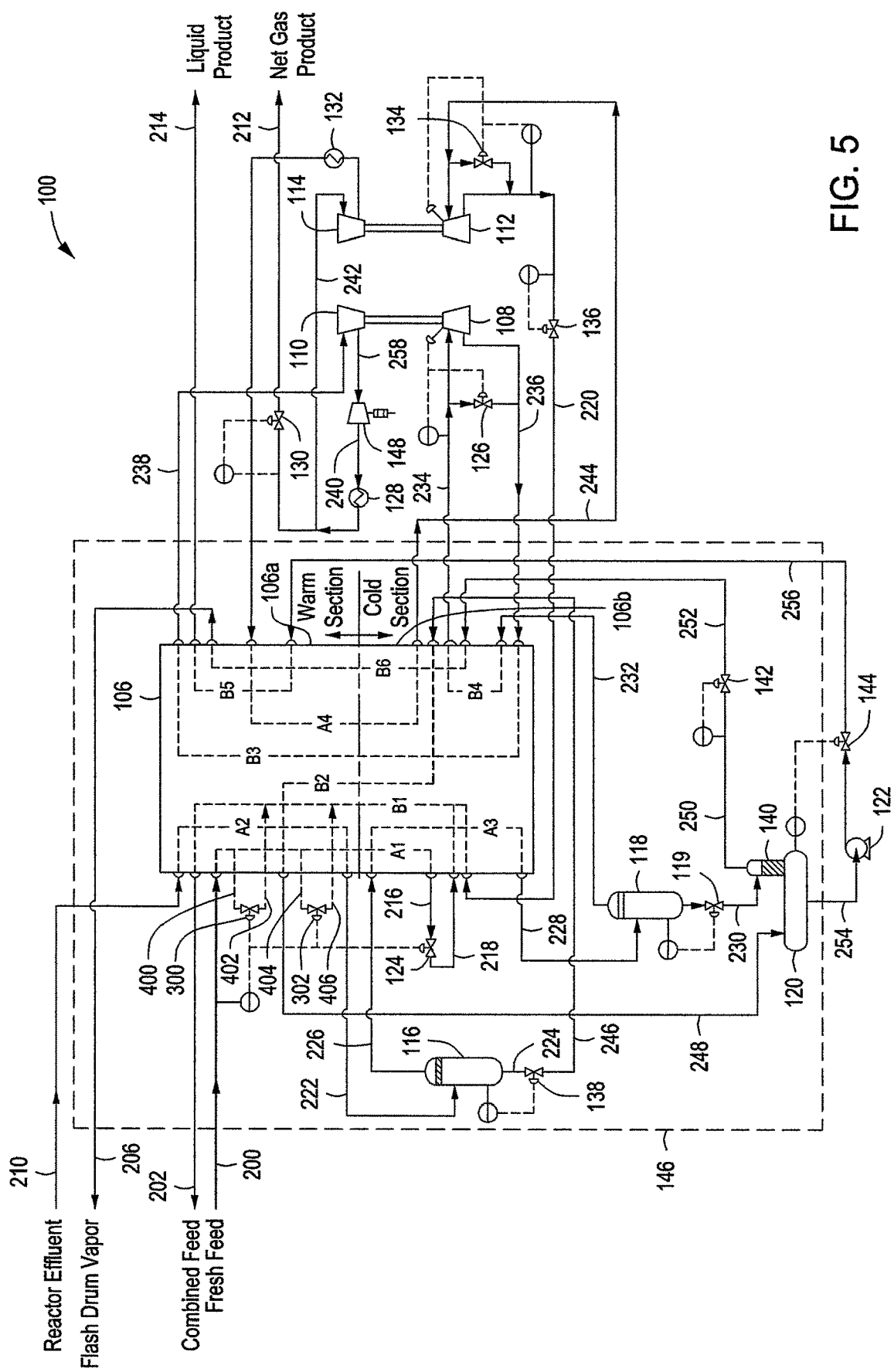
FIG. 5 is the schematic illustration, flow diagram of FIG. 2A with the alternative embodiment of the integrated main heat exchanger split into a warm section and a cold section.

FIG. 5 is the schematic illustration, flow diagram of FIG. 2A with the alternative embodiment of the integrated main heat exchanger 106 split into the warm section 106a and the cold section 106b. The warm section 106a and the cold section 106b can be composited of one or more brazed aluminum heat exchanger (BAHX) cores. As shown in FIG. 5, a side stream 400 is taken from warm pass A1 at a point at the upper end of the warm section 106a. The flow of side stream 400 is regulated by a control valve 300. The outlet stream 402 from control valve 300 then flows into pass B1 at the lower end of the warm section 106a. Further, as shown in FIG. 5, another side stream 404 is taken from warm pass A1 at a point at the lower end of the warm section 106a. The flow of side stream 404 is regulated by a control valve 302. The outlet stream 406 from control valve 302 then flows into pass B1 lower in the warm section 106a.

Figure 6:
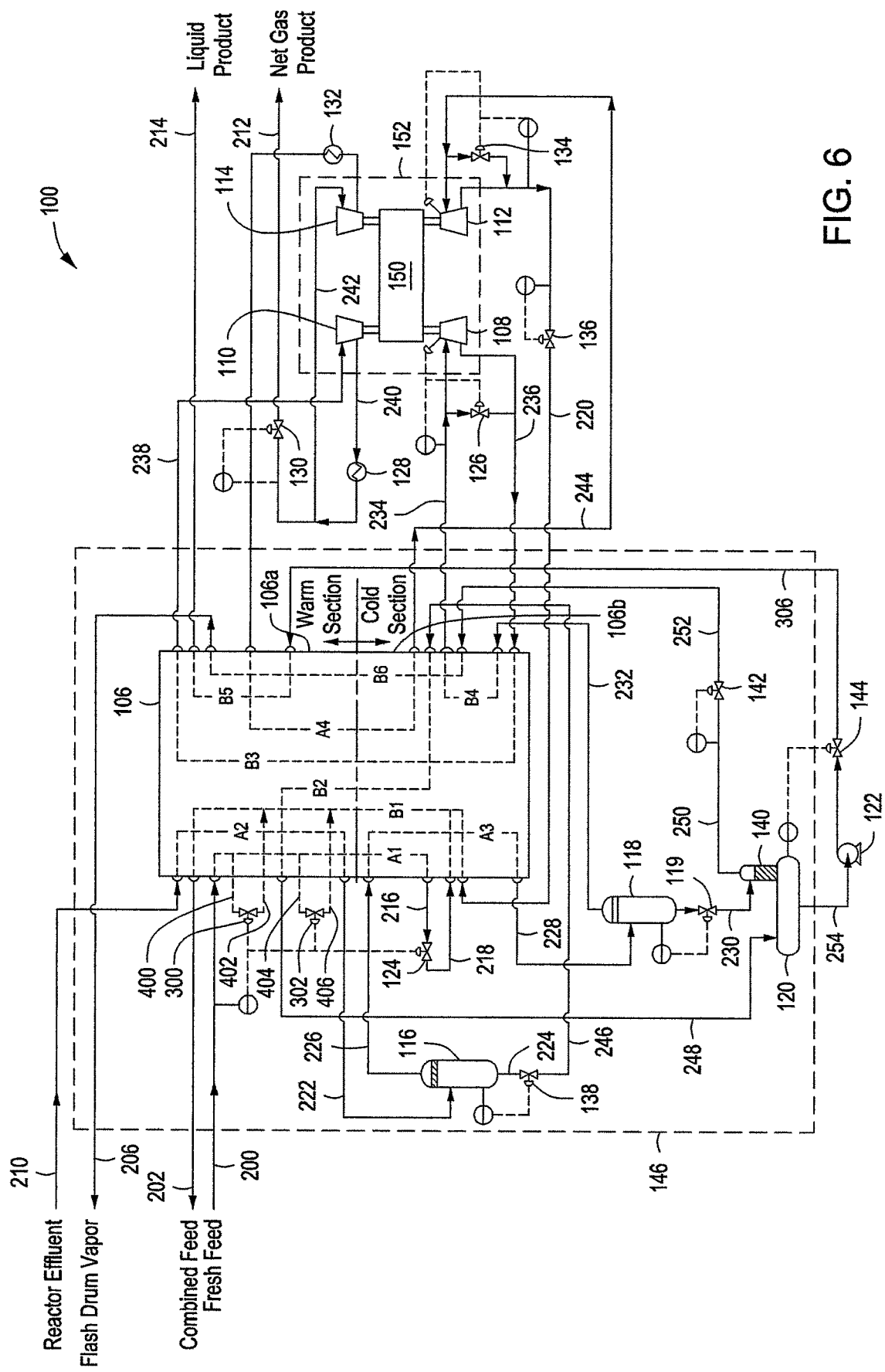
FIG. 6 is the schematic illustration, flow diagram of FIG. 2B with the alternative embodiment of the integrated main heat exchanger split into a warm section and a cold section.

FIG. 6 is the schematic illustration, flow diagram of FIG. 2B with the alternative embodiment of the integrated main heat exchanger 106 split into the warm section 106a and the cold section 106b. The warm section 106a and the cold section 106b can be composited of one or more brazed aluminum heat exchanger (BAHX) cores. As shown in FIG. 6, a side stream 400 is taken from warm pass A1 at a point at the upper end of the warm section 106a. The flow of side stream 400 is regulated by a control valve 300. The outlet stream 402 from control valve 300 then flows into pass B1 at the lower end of the warm section 106a. Further, as shown in FIG. 6, another side stream 404 is taken from warm pass A1 at a point at the lower end of the warm section 106a. The flow of side stream 404 is regulated by a control valve 302. The outlet stream 406 from control valve 302 then flows into pass B1 lower in the warm section 106a.

Figure 7:
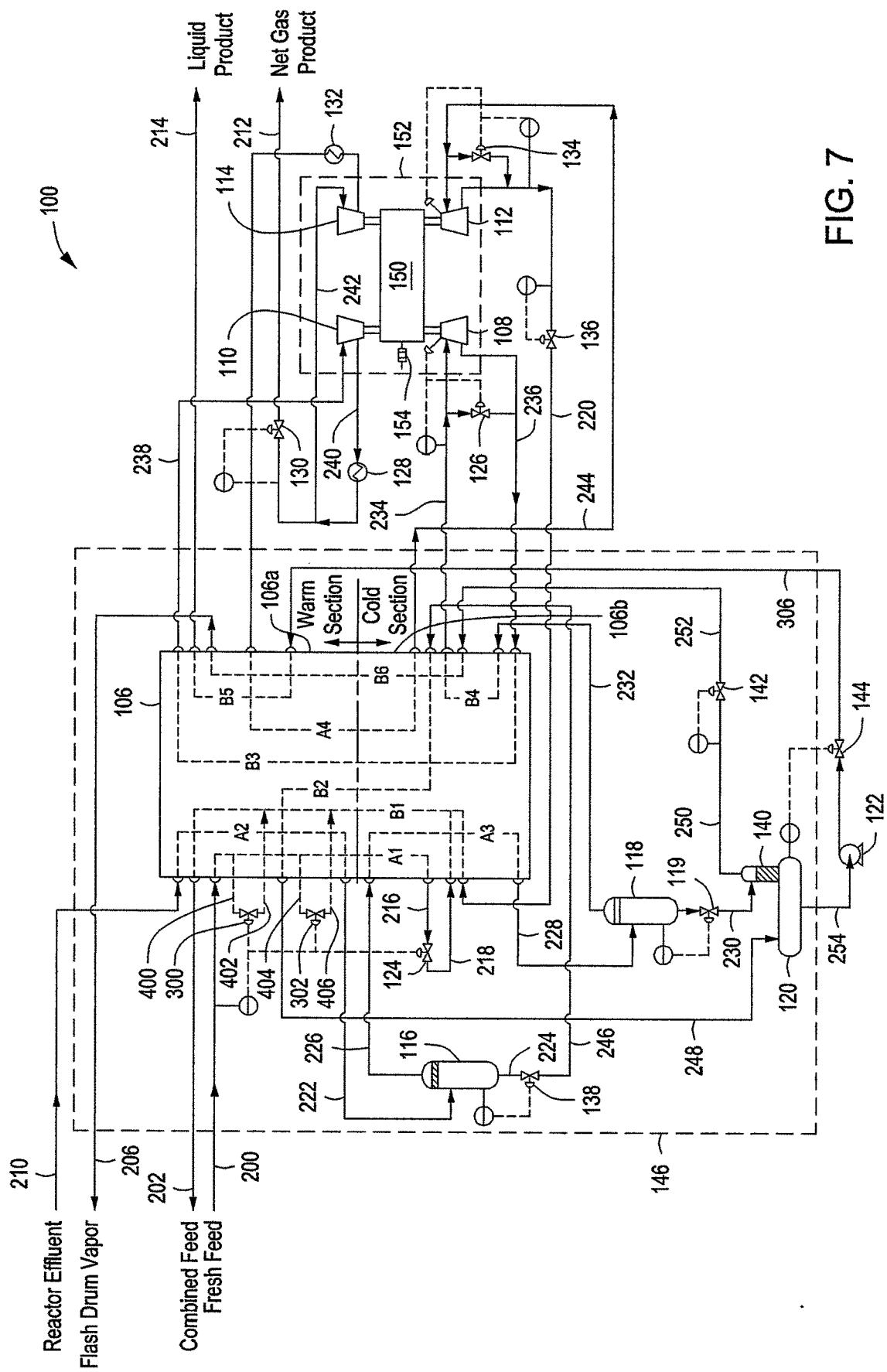
FIG. 7 is the schematic illustration, flow diagram of FIG. 2C with the alternative embodiment of the integrated main heat exchanger split into a warm section and a cold section.

FIG. 7 is the schematic illustration, flow diagram of FIG. 2C with the alternative embodiment of the integrated main heat exchanger 106 split into the warm section 106a and the cold section 106b. The warm section 106a and the cold section 106b can be composited of one or more brazed aluminum heat exchanger (BAHX) cores. As shown in FIG. 7, a side stream 400 is taken from warm pass A1 at a point at the upper end of the warm section 106a. The flow of side stream 400 is regulated by a control valve 300. The outlet stream 402 from control valve 300 then flows into pass B1 at the lower end of the warm section 106a. Further, as shown in FIG. 7, another side stream 404 is taken from warm pass A1 at a point at the lower end of the warm section 106a. The flow of side stream 404 is regulated by a control valve 302. The outlet stream 406 from control valve 302 then flows into pass B1 lower in the warm section 106a.

Figure 8:
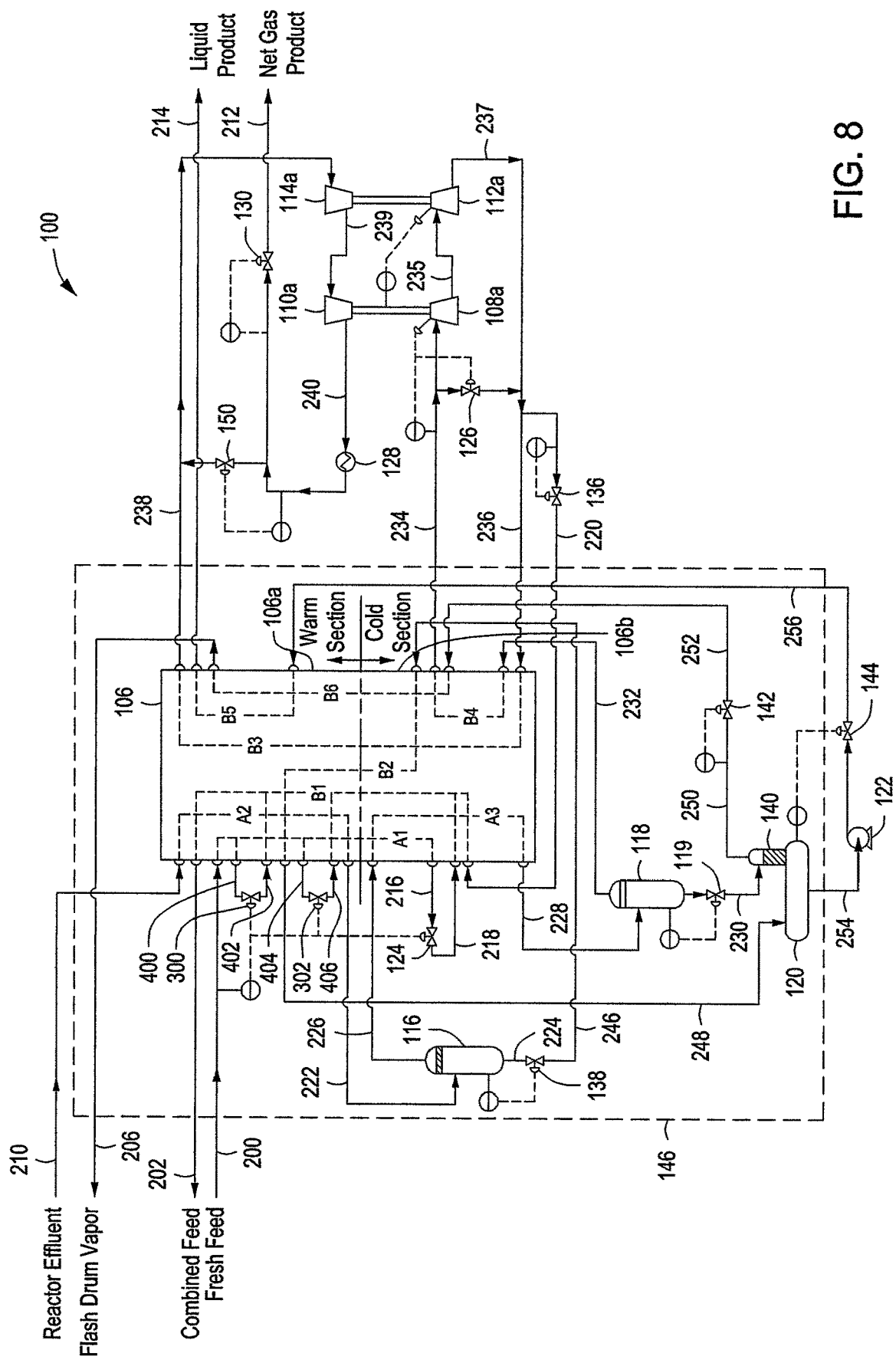
FIG. 8 is the schematic illustration, flow diagram of FIG. 2D with the alternative embodiment of the integrated main heat exchanger split into a warm section and a cold section.

FIG. 8 is the schematic illustration, flow diagram of FIG. 2D with the alternative embodiment of the integrated main heat exchanger 106 split into the warm section 106a and the cold section 106b. The warm section 106a and the cold section 106b can be composited of one or more brazed aluminum heat exchanger (BAHX) cores. As shown in FIG. 8, a side stream 400 is taken from warm pass A1 at a point at the upper end of the warm section 106a. The flow of side stream 400 is regulated by a control valve 300. The outlet stream 402 from control valve 300 then flows into pass B1 at the lower end of the warm section 106a. Further, as shown in FIG. 8, another side stream 404 is taken from warm pass A1 at a point at the lower end of the warm section 106a. The flow of side stream 404 is regulated by a control valve 302. The outlet stream 406 from control valve 302 then flows into pass B1 lower in the warm section 106a.

Figure 9:
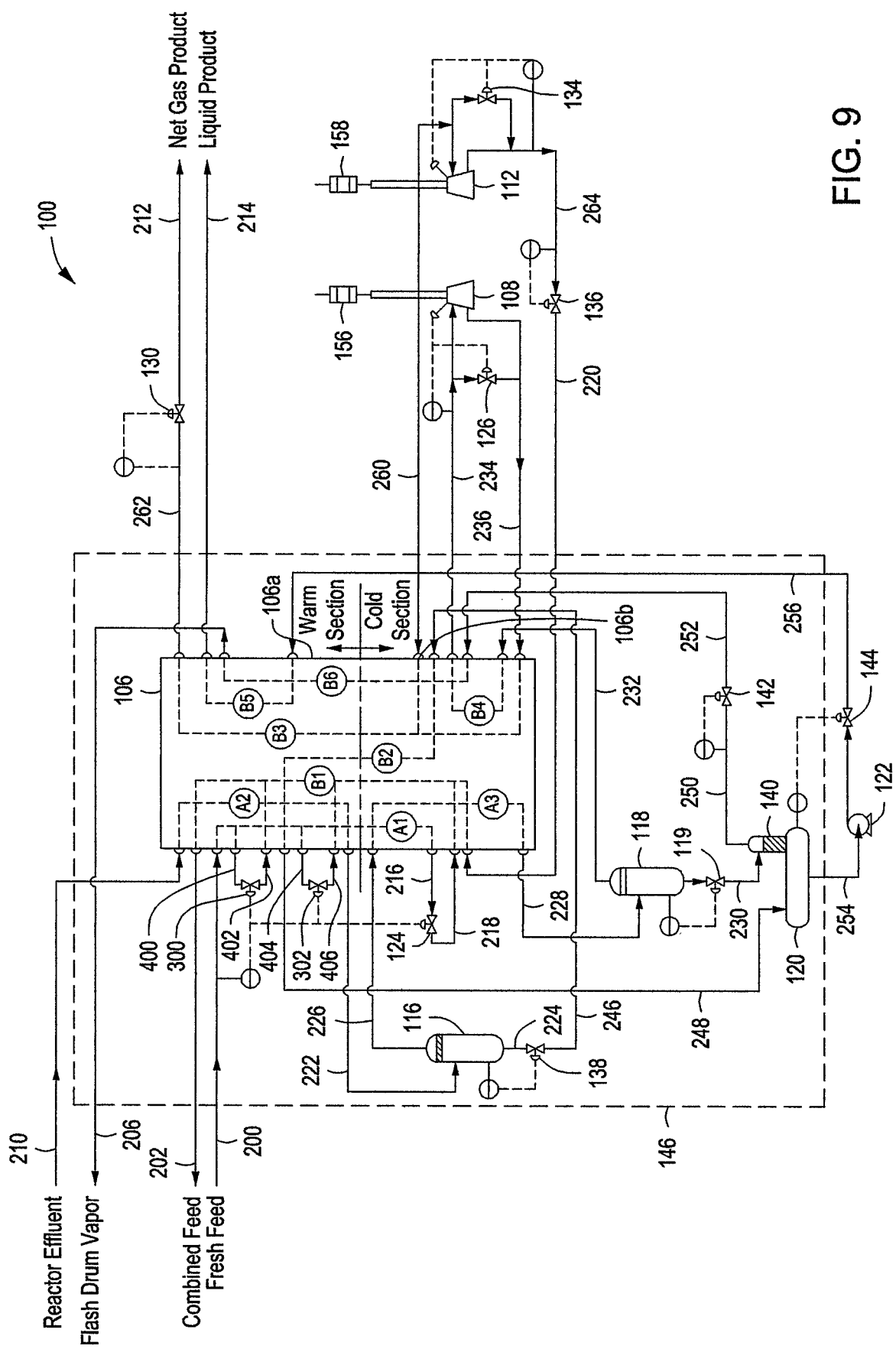
FIG. 9 is the schematic illustration, flow diagram of FIG. 3 with the alternative embodiment of the integrated main heat exchanger split into a warm section and a cold section.

FIG. 9 is the schematic illustration, flow diagram of FIG. 3 with the alternative embodiment of the integrated main heat exchanger 106 split into the warm section 106a and the cold section 106b. The warm section 106a and the cold section 106b can be composited of one or more brazed aluminum heat exchanger (BAHX) cores. As shown in FIG. 9, a side stream 400 is taken from warm pass A1 at a point at the upper end of the warm section 106a. The flow of side stream 400 is regulated by a control valve 300. The outlet stream 402 from control valve 300 then flows into pass B1 at the lower end of the warm section 106a. Further, as shown in FIG. 9, another side stream 404 is taken from warm pass A1 at a point at the lower end of the warm section 106a. The flow of side stream 404 is regulated by a control valve 302. The outlet stream 406 from control valve 302 then flows into pass B1 lower in the warm section 106a.

Figure 10:
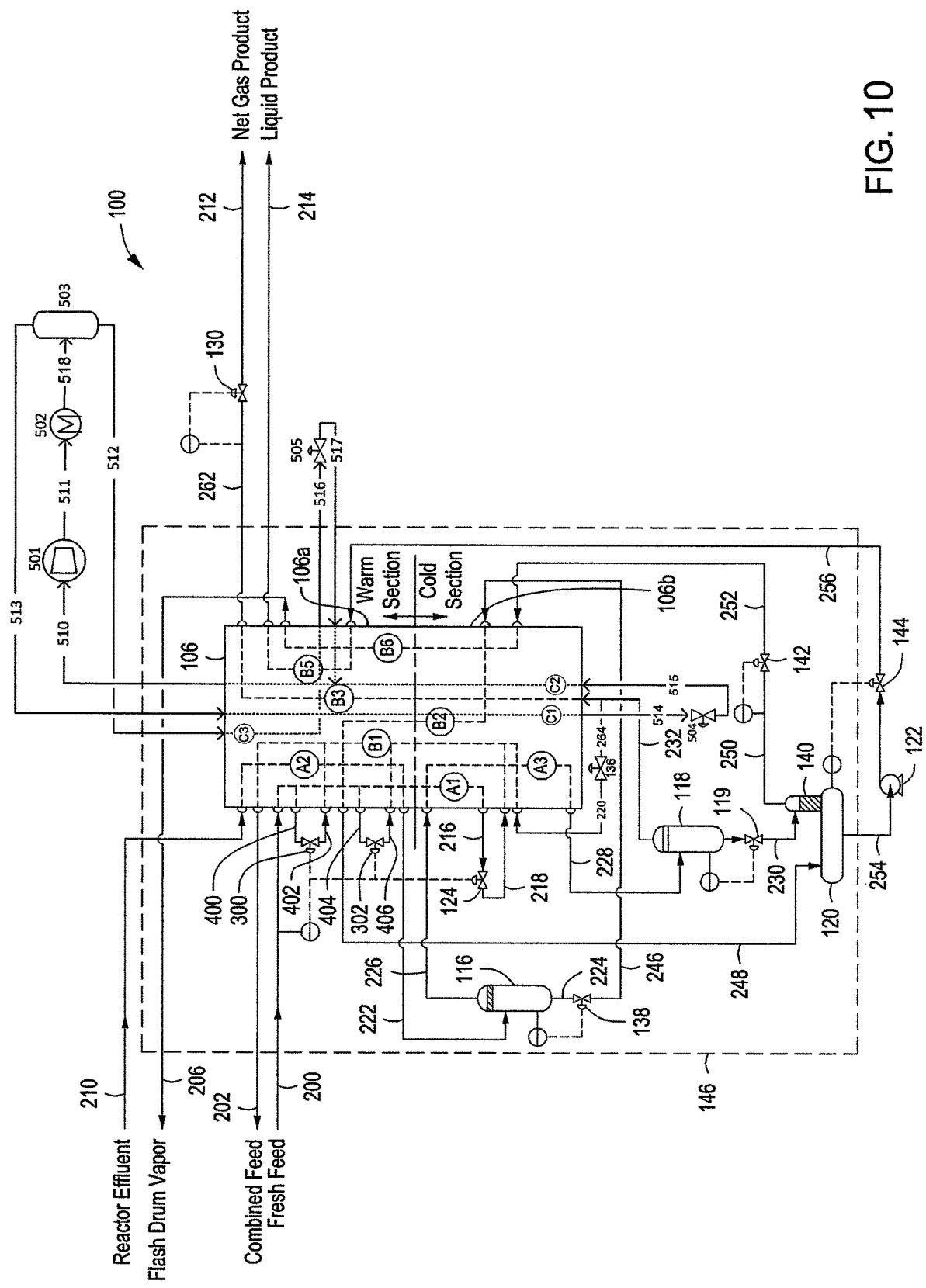
FIG. 10 is a schematic illustration, flow diagram of FIG. 9, but showing the optional use of an external refrigeration system using a mixed refrigerant.

FIG. 10 shows the external refrigeration system option of the processing unit 100 in FIG. 1. It illustrates configuration of the integrated main heat exchanger 106, an external refrigeration system, the first stage cold gas-liquid separator 116, the second stage cold gas-liquid separator 118, the liquid product drum 120, and the liquid product pump 122. Similarly to the aforementioned embodiments, the integrated main heat exchanger 106 may be split into warm section 106a and cold section 106b and further composited of one or more brazed aluminum heat exchanger (BAHX) cores as shown in FIGS. 4-9. The differences between the embodiment shown in FIG. 10 and the embodiments shown in FIGS. 2-9 include the removal of the expander/compressor systems and the addition of the external refrigeration system.

The external refrigeration system may be a closed-loop refrigeration system that provides refrigeration to the effluent gas streams entering the processing unit 100. In embodiments, the external refrigeration system may utilize and circulate a mixed refrigerant (MR) composition comprising one or more hydrocarbon components such as, without limitation, methane, ethane, ethylene, propane, propylene, butanes, or any combinations thereof. An example of an MR composition may be a mixture of methane, ethylene, and propane. Further, the external refrigeration system may comprise at least one mixed refrigerant compressor to pressurize the MR stream. The at least one mixed refrigerant compressor may be a single or multi-stage compressor system comprising a discharge cooler after each compressor stage and a discharge vapor/liquid separator after each discharge cooler. In embodiments, the external refrigeration system may comprise mixed refrigerant compressor 501, discharge cooler 502, and discharge vapor/liquid separator 503. The discharge vapor/liquid separator 503 may separate the MR composition, resulting in two product streams: a pressurized and cooled vapor refrigerant stream 513 and a pressurized and cooled liquid refrigerant stream 512.

The pressurized and cooled vapor refrigerant stream 513 from the discharge vapor/liquid separator 503 may be at a pressure between about 2,500 kPa·G and about 4,000 kPa·G. In embodiments, the discharge vapor/liquid separator 503 may be a standard vapor/liquid flash separation vessel capable of separating the MR composition into a vapor product and a liquid product. Stream 513 may enter at the top of integrated main heat exchanger 106 and travel down through pass C1 to be cooled and totally liquified by the cold passes B1, B2, B3, B5, B6, and C2 to a temperature between about −100° C. and about −120° C. As such, stream 513 may exit the integrated main heat exchanger 106 as cooled liquid stream 514. Stream 514 may be reduced to a pressure between about 150 kPa·G and about 450 kPa·G and further cooled to a temperature between about −105° C. and about −130° C. via a pressure control valve 504, resulting in a pressure-reduced, temperature-decreased vapor/liquid mixed stream 515. Stream 515 may then enter at the bottom of integrated main heat exchanger 106 and travel upward through pass C2 to provide refrigeration to the warm passes such as A1, A2, A3, and C1 through vaporization of the MR composition. As such, stream 515 may exit the integrated main heat exchanger 106 as warm, vaporized stream 510 with a pressure between about 50 kPa·G and about 350 kPa·G. Stream 510 may flow to the mixed refrigerant compressor 501, such that stream 510 comprising the MR composition may be compressed to stream 511, and then cooled and condensed by the discharge cooler 502, resulting in stream 518. In embodiments, the discharge cooler 502 may be an air cooler or a water cooler. Stream 518 may finally enter discharge vapor/liquid separator 503 to provide the pressurized and cooled vapor refrigerant stream 513 and the pressurized and cooled liquid refrigerant stream 512. In some embodiments, the warm, vaporized stream 510 may first travel through a suction scrubber before entering the mixed refrigerant compressor 501.

The pressurized and cooled liquid refrigerant stream 512 from discharge vapor/liquid separator 503 may also be at a pressure between about 2,500 kPa·G and about 4,000 kPa·G. In embodiments, stream 512 may enter at the top of integrated main heat exchanger 106, travel down through pass C3, and exit as a subcooled liquid stream 516. Stream 516 may be reduced in pressure and cooled in temperature via a second pressure control valve 505, resulting in a pressure-reduced, temperature-decreased liquid stream 517. Stream 517 may then enter the integrated main heat exchanger 106 to combine with stream 515 in pass C2.

Figure 11:
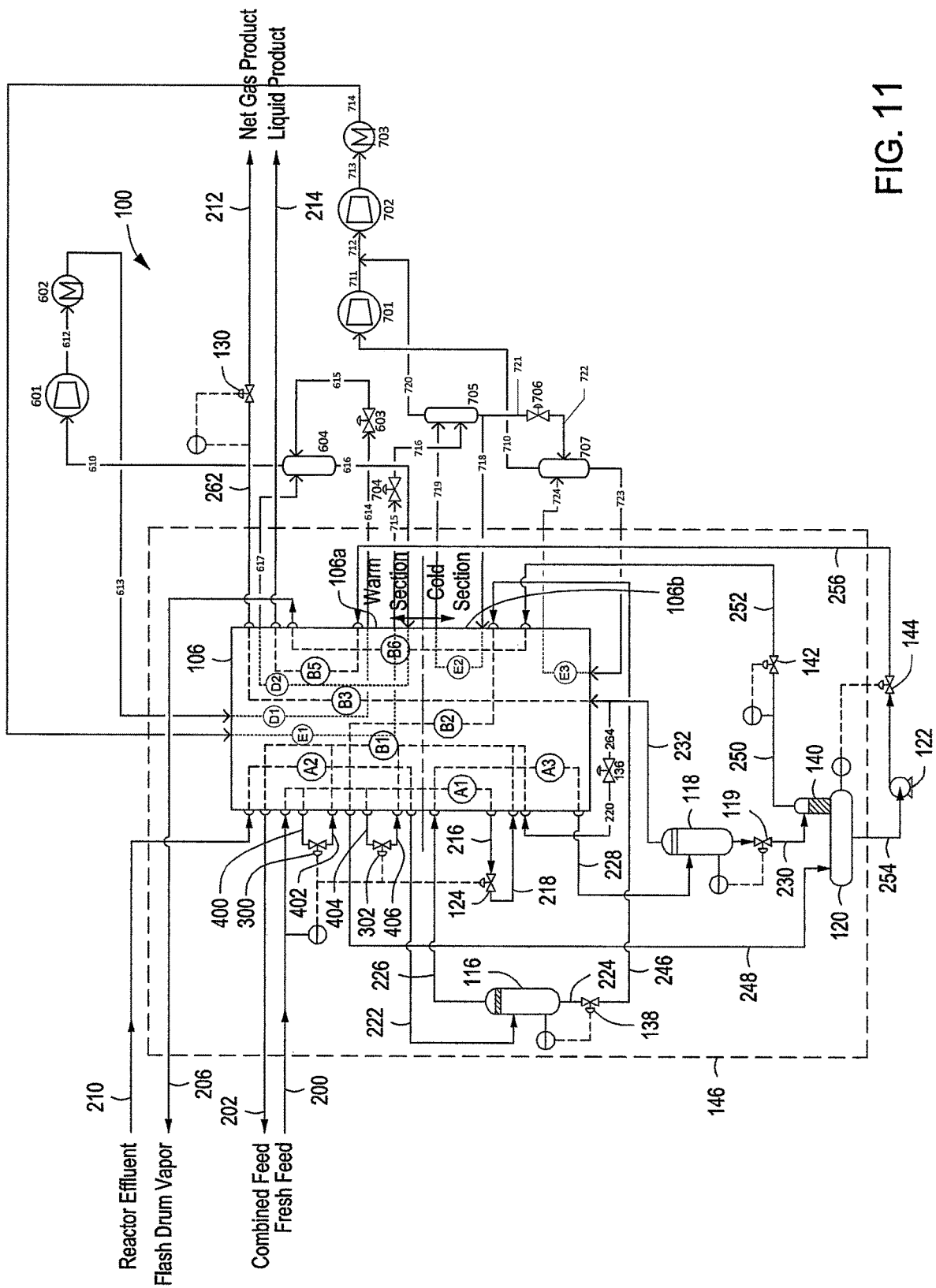
FIG. 11 is a schematic illustration, flow diagram of FIG. 9, but showing the optional use of an external cascade refrigeration system having two or more refrigeration cycles.

FIG. 11 shows the external cascade refrigeration system option of the processing unit 100 in FIG. 1. It illustrates configuration of the integrated main heat exchanger 106, an external cascade refrigeration system, the first stage cold gas-liquid separator 116, the second stage cold gas-liquid separator 118, the liquid product drum 120, and the liquid product pump 122. Similarly to the aforementioned embodiments, the integrated main heat exchanger 106 may be split into warm section 106a and cold section 106b and further composited of one or more brazed aluminum heat exchanger (BAHX) cores as shown in FIGS. 4-9. The differences between the embodiment shown in FIG. 11 and the embodiments shown in FIGS. 2-9 include the removal of the expander/compressor systems and the addition of the external cascade refrigeration system.

The external cascade refrigeration system may be a composite of multiple closed-loop external refrigeration cycles that provide refrigeration to the effluent gas streams entering the processing unit 100. In embodiments, the external cascade refrigeration system may comprise a first external refrigeration cycle and a second external refrigeration cycle. The first external refrigeration cycle may utilize and circulate a refrigerant comprising propane, or propylene, or any combinations thereof. Further, the first external refrigeration cycle may comprise a recycle compressor 601, to pressurize the refrigerant, and a thermosiphon vessel 604. The recycle compressor 601 may be a single or multi-stage compressor system comprising a discharge condenser 602 at its final compression discharge stage. The final stage discharge condenser 602 may condense the refrigerant resulting in a pressurized and totally condensed saturated liquid refrigerant stream 613.

The pressurized and totally condensed saturated liquid refrigerant stream 613 from the final stage discharge condenser 602 may be at a pressure between about 1,000 kPa·G and about 1,750 kPa·G. In embodiments, the discharge condenser 602 may be an air cooler or a water cooler. Stream 613 may enter the integrated main heat exchanger 106 and travel down through pass D1 to be sub-cooled by the cold passes B1, B2, B3, B5, B6, and D2 to a temperature between about $-10°$ C. and about $-25°$ C. As such, stream 613 may exit the integrated main heat exchanger 106 as sub-cooled liquid stream 614. Stream 614 may be reduced to a pressure between about 15 kPa·G and about 50 kPa·G and further cooled to a temperature between about $-30°$ C. and about $-45°$ C. via a level control valve 603, resulting in a pressure-reduced, temperature-decreased vapor/liquid mixed stream 615. Stream 615 may then enter a thermosiphon vessel 604, which may be a vertical vessel configured to maintain a steady internal liquid level. The steady internal liquid level may allow for the formation of a thermosiphon that may be capable of circulating a cold liquid refrigerant stream 616 from the bottom of the thermosiphon vessel 604, through pass D2 of the integrated main heat exchanger 106, and then back to an upper inlet of the thermosiphon vessel 604 as a two-phase refrigerant stream 617. Stream 617 may comprise between about 30% and about 50% vapor in order to maintain a steady operation of the thermosiphon circulation. In embodiments, the cold liquid refrigerant stream 616 which travels upward through pass D2 may vaporize to provide refrigeration to the warm passes such as A1, A2, D1, and E1. Finally, a flashed vapor stream 610 resulting from the thermosiphon vessel 604 may flow to the recycle compressor 601, such that stream 610 comprising the refrigerant may be compressed to stream 612, and then cooled and condensed by the final stage discharge condenser 602, resulting in stream 613. In some embodiments, the flashed vapor stream 610 may first travel through a suction scrubber before entering the recycle compressor 601.

The second external refrigeration cycle may utilize and circulate an alternate refrigerant comprising ethane, or ethylene, or any combinations thereof. Alternatively, the alternate refrigerant may comprise a mixture of methane and ethylene or ethane. Further, the second external refrigeration cycle may also comprise one or more stages of recycle compressors (e.g., a first recycle compressor 701 and a second recycle compressor 702) to pressurize the alternate refrigerant and one or more thermosiphon vessels (e.g., a warm thermosiphon vessel 705 and a cold thermosiphon vessel 707). The one or more recycle compressors (701/702) may be a multi-stage compressor system comprising a discharge cooler 703 at its final compression discharge stage. The final stage discharge cooler 703 may cool the alternate refrigerant resulting in a pressurized and cooled refrigerant stream 714.

The pressurized and cooled refrigerant stream 714 from the final stage discharge cooler 703 may be at a pressure between about 1650 kPa·G and about 1,950 kPa·G. In embodiments, the discharge cooler 703 may be an air cooler or a water cooler. Stream 714 may enter the integrated main heat exchanger 106 and travel down through pass E1 to be cooled and totally condensed by the cold passes B, B2, B3, B5, B6, and D2 to a temperature between about $-30°$ C. and about $-40°$ C. As such, stream 714 may exit the integrated heat exchanger 106 as a cooled and totally condensed liquid stream 715. Steam 715 may be reduced to a pressure between about 450 kPa·G and about 700 kPa·G and further reduced its temperature to between about $-50°$ C. and about $-70°$ C. via a level control valve 704, resulting in a pressure-reduced, temperature decreased vapor/liquid mixed stream 716. Stream 716 may enter the warm thermosiphon vessel 705 which, similar to thermosiphon vessel 604, may be a vertical vessel configured to maintain a steady internal liquid level. The steady internal liquid level may allow for the formation of a thermosiphon that may be capable of circulating a warm liquid refrigerant stream 718 from the bottom of the warm thermosiphon vessel 705, through pass E2 of the integrated main heat exchanger 106, and then back to an upper inlet of the warm thermosiphon vessel 705 as a two-phase refrigerant stream 719. Stream 719 may comprise between about 30% and about 50% vapor in order to maintain a steady operation of the thermosiphon circulation. In embodiments, the warm liquid refrigerant stream 718, which travels upward through pass E2, may vaporize to provide refrigeration to the warm passes such as A1 and A3. A flashed vapor stream 720, resulting from the warm thermosiphon vessel 705, may flow to and mix with any recycle compressor discharge stream from any compression discharge stage previous to the final compression discharge stage. In embodiments, the flashed vapor stream 720 may flow to and mix with a first stage recycle compression discharge stream 711 from the first recycled compressor 701 to result in a feed stream 712 that may flow to the second recycled compressor 702, such that stream 712 comprising the alternate refrigerant may be compressed to stream 713, and then cooled by the final stage discharge cooler 703, resulting in stream 714. In some embodiments, the feed stream 712 may first travel through a suction scrubber before entering the second recycle compressor 702.

In further embodiments, an additional warm liquid refrigerant stream 721 may be drawn from stream 718 at the bottom of warm thermosiphon vessel 705. Stream 721 may be reduced to a pressure between about 5 kPa·G and about 50 kPa·G and further reduced its temperature to between about $-95°$ C. to about $-115°$ C. via a level control valve 706, resulting in a pressure-reduced, temperature-decreased liquid stream 722. Stream 722 may enter the cold thermosiphon vessel 707 which, also similar to thermosiphon 604, may be a vertical vessel configured to maintain a steady internal liquid level. The steady internal liquid level may allow for the formation of a thermosiphon that may be capable of circulating a cold liquid refrigerant stream 723 from the bottom of the cold thermosiphon vessel 707, through pass E3 of the integrated main heat exchanger 106, and then back to an upper inlet of thermosiphon 707 as a two-phase refrigerant stream 724. Stream 724 may comprise between about 30% and about 50% vapor in order to maintain a steady operation of the thermosiphon circulation. In embodiments, the cold liquid refrigerant stream 723, which travels upward through pass E3, may vaporize to provide refrigeration to the warm passes such as A1 and A3. Finally, a flashed vapor stream 710, resulting from the thermosiphon vessel 707, may flow to the first recycle compressor 701, such that stream 710 comprising the alternate refrigerant may be compressed, resulting in the first stage recycle compression discharge stream 711. In some embodiments, the flashed vapor stream 710 may first travel through a suction scrubber before entering the first recycle compressor 701.

Further differences between the embodiments shown in FIGS. 10-11, and the embodiments shown in FIGS. 2-9 include the removal of pass B4 and the altered path flow of stream 232. As illustrated in FIGS. 10 and 11, stream 232 may enter at the bottom of integrated main heat exchanger 106 and travel upward through pass B3 such that the stream 232 may be warmed and exit the integrated main heat exchanger 106 as the net gas product 212. Further, stream 220, which in previous embodiments was a resulting stream from the expander system, may now be a stream split from stream 232. In embodiments, stream 220 may be the result of a stream 264 split from stream 232 that may be reduced to a pressure between about 195 kPa·G and about 450 kPa·G and cooled to a temperature between about −95° C. and about −125° C. via a flow control valve 136. As with previous embodiments, stream 220 may enter the integrated main heat exchanger 106 where it mixes with outlet stream 218 of flow control valve 124. The mixed stream of stream 220 and outlet stream 218 may travel upward through pass B1, where heat exchanging occurs between the cold stream pass B1 and warm stream passes A1, A2, A3, and A4, as well as C1, C3, D1, and E1. Before exiting through pass B1, the mixed stream is completely vaporized and becomes a superheated vapor stream. The superheated vapor stream is referred to as combined feed 202 after exiting pass B1. The pressure of combined feed 202 is maintained at a constant value by the feed of the dehydrogenation unit 102 (not shown). The combined feed 202 is the reactor feedstock for dehydrogenation unit 102 (not shown).

Figure 12:
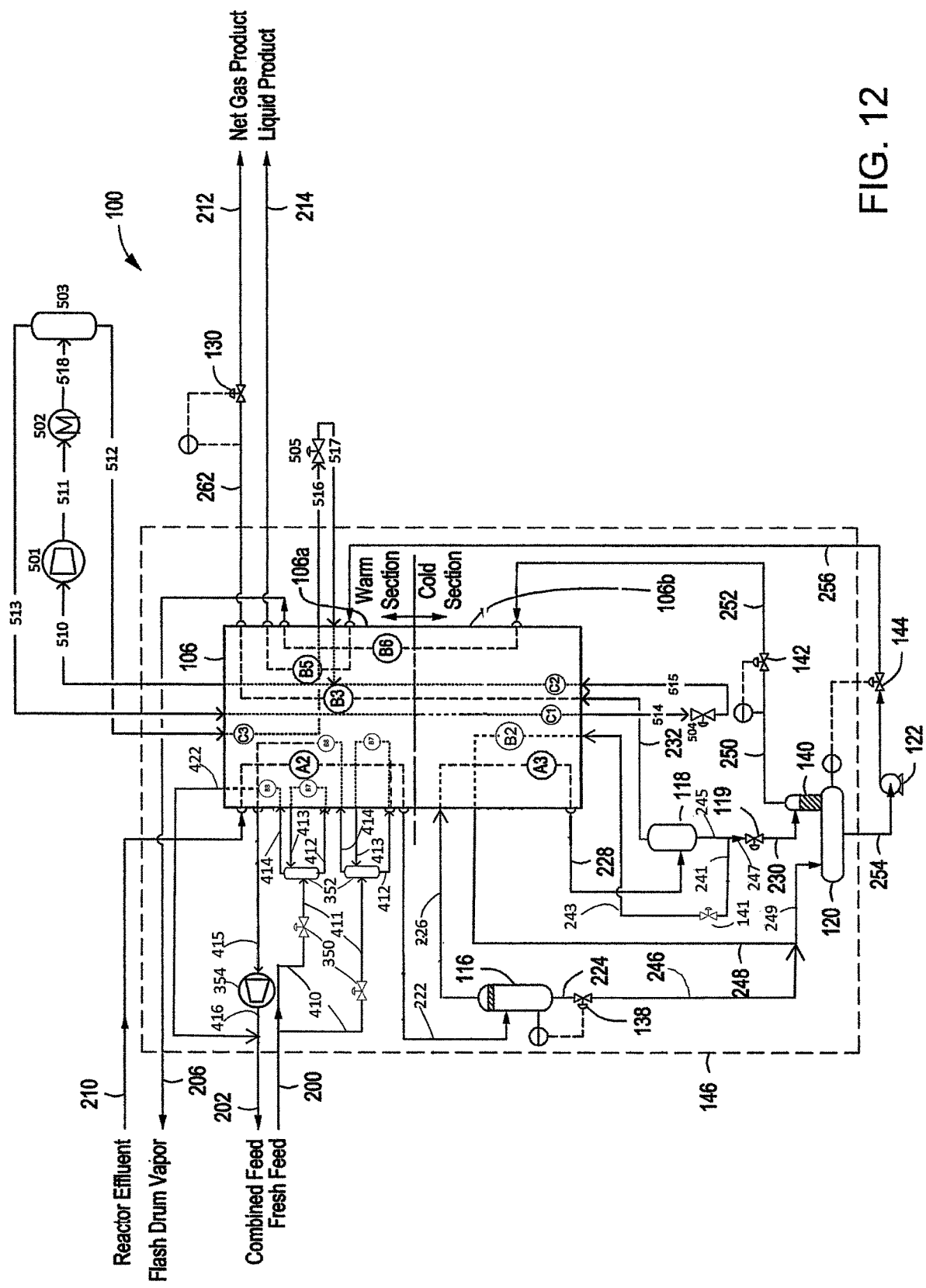
FIG. 12 is a schematic illustration, flow diagram of FIG. 10, but showing an alternative "no recycle gas" embodiment that does not utilize a recycled gas stream.

FIG. 12 shows the "no recycle gas" option of the processing unit 100 in FIG. 10. In FIG. 10, the fresh feed 200 and the recycle gas stream 220 may be mixed and vaporized in the heat exchanger 106 of the processing unit 100, thereby providing the combined feed 202. However, FIG. 12 shows an alternative embodiment that processes and/or vaporizes fresh feed 200, without combining the recycle gas stream 220, thereby providing an alternative combined feed 202. It illustrates configuration of the integrated main heat exchanger 106, the external refrigeration system, the first stage cold gas-liquid separator 116, the second stage cold gas-liquid separator 118, the liquid product drum 120, and the liquid product pump 122, as well as a plurality of fresh feed control valves 350, a plurality of fresh feed thermosiphon vessels 352, and one or more vapor fresh feed compressors 354. Similarly to the aforementioned embodiments, the integrated main heat exchanger 106 may be split into warm section 106a and cold section 106b and further composited of one or more brazed aluminum heat exchanger (BAHX) cores as shown in FIGS. 4-9. The differences between the embodiment shown in FIG. 12 and the embodiment shown in FIG. 10 may include the removal of the recycle gas stream 220/264 and their corresponding control valve 136. By this removal of the recycle gas stream 220, fresh feed 200 may be processed and/or vaporized differently within processing unit 100. Therefore, further differences between the embodiments may include the removal of control valves 124, 300, and 302, their corresponding side streams and outlet streams 216, 218, 400, 402, 404, and 406, and pass A1, as well as the addition of the plurality of fresh feed control valves 350, the plurality of fresh feed thermosiphon vessels 352, and the one or more vapor fresh feed compressors 354.

As illustrated in FIG. 12, fresh feed 200 may be divided into a plurality of split streams 410, each at any suitable pressure and temperature. In embodiments, each of the plurality of split streams 410 may be reduced to a pressure between about 50 kPa·G and about 200 kPa·G and further cooled to a temperature between about −35° C. and about −15° C., or alternatively between about −15° C. and about 5° C., via the plurality of fresh feed control valves 350, resulting in a plurality of pressure-reduced, temperature-decreased split streams 411. Each of the plurality of streams 411 may enter the plurality of fresh feed thermosiphon vessels 352, respectively. Each of the plurality of fresh feed thermosiphon vessels 352 may be vertical vessels configured to maintain a steady internal liquid level. The steady internal liquid level may allow for the formation of a thermosiphon that may be capable of circulating a cold fresh feed liquid stream 412 from the bottom of each of the plurality of fresh feed thermosiphon vessel 352, through a pass B7 at about the middle of the warm section 106a of the main heat exchanger 106, then back into an upper inlet of each of the plurality of fresh feed thermosiphon vessels 352 as a two-phase stream 413, comprising a vapor phase and a liquid phase. For instance, each of the plurality of two-phase streams 413 may comprise between about 30% and about 50% vapor in order to maintain steady operation of the thermosiphon circulation. In embodiments, the liquid phase of each of the plurality of two-phase streams 413 may be combined to each of the plurality of cold fresh feed liquid streams 412 which travel upward through respective passes B7 and vaporize to provide cooling to the warm passes such as A2, C1, and C3. In addition, each of the plurality of fresh feed thermosiphon vessels 352 may provide a flashed cold fresh feed vapor stream 414, which may include the vapor phase of each of the plurality of two-phase streams 413. Each of the plurality of flashed cold fresh feed vapor streams 414 may enter the integrated main heat exchanger 106 at about the middle of the warm section 106a and travel upward through respective passes B8, thus providing additional cooling to the warm passes A2, C1, and C3. Furthermore, as each of the plurality of flashed cold fresh feed vapor streams 414 travel through their respective passes B8, the streams 414 may be warmed to temperatures close to that of the reactor effluent 210, thus becoming a plurality of superheated vapor streams 415 upon exit at the upper end of the warm section 106a of main heat exchanger 106. In embodiments, one of the plurality of superheated vapor streams 415 may include a final-stage superheated vapor stream 422. Each of the plurality superheated vapor streams 415, excluding the final-stage superheated vapor stream 422, may be compressed to a pressure between about 200 kPa·G and about 450 kPa·G via the one or more fresh feed vapor compressors 354, resulting in one or more compressed superheated vapor streams 416. Finally, the one or more compressed superheated vapor streams 416 may be comingled, along with the final-stage superheated vapor stream 422, resulting in the alternative combined feed 202. The pressure of the alternative combined feed stream 202 may be maintained at a constant value by the feed of the dehydrogenation unit 102 (not shown). The alternative combined feed 202 may once again be a reactor feedstock for dehydrogenation unit 102 (not shown). For solely illustrative purposes, FIG. 12 shows two split streams 410, two fresh feed control valves 350, two fresh feed thermosiphon vessels 352, two passes B7, two passes B8, one superheated vapor stream 415, one final-stage superheated vapor stream 422, and one vapor fresh feed compressor 354. However, the processing unit 100 may comprise any suitable number of split streams 410, fresh feed control valves 350, fresh feed thermosiphon vessels 352, passes B7 and B8, and vapor fresh feed compressors 354.

As further illustrated in FIG. 12, reactor effluent 210, an olefin-hydrogen effluent stream from the reactor effluent compressor unit 104 (not shown), enters pass A2 at the upper warm end of the warm section 106a of the integrated main heat exchanger 106, where the stream is cooled to a low temperature as it flows through and exits pass A2 at the lower end of the warm section 106a of the integrated main heat exchanger 106. The cooling of the reactor effluent 210 as it travels through pass A2 is caused by cold stream passes B3, B5, B6, B7, B8 and C2. Outlet stream 222 from pass A2 enters the first stage cold gas-liquid separator 116 with a low temperature, at which time a majority, >95%, of the olefin and heavy paraffinic components in outlet stream 222 are condensed to liquid, which is separated out as liquid stream 224. Further, almost all, >99% of the hydrogen from outlet stream 222 remains vapor, and the first stage cold gas-liquid separator 116 separates out the vapor as vapor stream 226.

The vapor stream 226 then flows back to the upper end of the cold section 106b of the integrated main heat exchanger 106 through pass A3, where it is cooled to a lower temperature by the time it exits pass A3 at the lower end of the cold section 106b of the integrated main heat exchanger 106. The outlet stream 228 from pass A3 enters the second stage cold gas-liquid separator 118, where almost all, >85%, of the olefin and heavy paraffinic components in an outlet stream 228 are condensed to a liquid stream 245 and almost all, >99.95% of the hydrogen stays in a cold vapor stream 232. The cold vapor stream 232 exits second stage cold gas-liquid separator 118 and returns to the lower end of the cold section 106b of the integrated main heat exchanger 106 at pass B3. The cold vapor stream 232 travels up pass B3, where it exchanges heat with warm stream passes A3, A2, C1 and C3. As such cold vapor stream 232 may be warmed as it travels through pass B3. Upon exiting pass B3 at the upper end of the warm section 106a of the integrated main heat exchanger 106, the temperature of cold vapor stream 232 may be a temperature close to the inlet temperature of pass A2. The outlet stream 262 from pass B3 is typically regulated by a control valve 130 to maintain the pressure of the second stage cold gas-liquid separator 118. The outlet stream of control valve 130 is the net gas product 212, which may be sent to a downstream production facility.

Returning to the first stage cold gas-liquid separator 116, the pressure of the olefin-rich liquid stream 224 is reduced by level control valve 138 before it enters the liquid product drum 120 as cold stream 246.

Returning to the second stage cold gas-liquid separator 118, the olefin-rich liquid stream 245 may be split into two streams 241 and 247, with stream 247 having about 15% to 20% of the total flow of the stream 245. The pressure of the olefin-rich liquid stream 241 is reduced by level control valve 141, resulting in a pressure-reduced stream 243 which may enter pass B2 from the lower end of the cold section 106b of the main heat exchanger 106. In embodiments, the pressure-reduced stream 243 may be a cold stream that exchanges heat with the warm passes A3 and C1, becoming a partially vaporized stream 248. This partially vaporized stream 248 exits pass B2 at the upper end of the cold section 106b of the integrated main heat exchanger 106 and flows to the liquid product drum 120, combining with the cold stream 246. As for stream 247, flow control valve 119 may reduce the pressure of stream 247, resulting in a reduced-pressure stream 230 which may enter the top of rectifier 140 as the rectifier's reflux liquid.

A combined liquid stream 249 from stream 246 and 248 may enter the liquid product drum 120, where light components, mainly hydrogen, methane, ethane, and maybe some C3+ components, flash out from the liquid and travel upward through the rectifier 140 located on the top of the liquid product drum 120 or installed separately from the liquid product drum 120. The upward traveling hydrogen-rich gas in the rectifier 140, which may be a packed column, makes contact with the downward traveling colder reflux liquid stream 230 from the second stage cold gas-liquid separator 118. Heat and mass transferring occurs in the rectifier 140, and therefore the hydrogen-rich gas in the rectifier 140 is further purified to meet the minimum hydrogen content specification of the flash drum vapor 206, before exiting the top of the rectifier 140 as a vapor stream 250.

The pressure of the liquid product drum 120 is maintained by a pressure control valve 142 on vapor stream 250 to a constant pressure to maximize the recovery of olefin and heavy hydrocarbon components in the liquid product 254 and to meet the specification of the maximum allowable hydrogen content in the liquid product 254.

After the pressure control valve 142, a cold stream 252 contains certain olefin components in addition to the main light components hydrogen, methane, and ethane. The cold stream 252 enters cold stream pass B6 at the lower end of the cold section 106b of the integrated main heat exchanger 106. As cold stream 252 travels up pass B6, it exchanges heat with the warm stream passes A3, C1, A2, and C3, and cold stream 252 is warmed to a temperature close to the inlet temperature of reactor effluent 210 or fresh feed 200 as it exits pass B6 from the upper end of the warm section 106a of the main heat exchanger 106. The flash drum vapor 206 from pass B6 then flows back to the inlet of the reactor effluent compressor unit 104 (not shown).

The separated cold liquid stream 254 from the liquid product drum 120 is pumped by the liquid product pump 122 to a pressure that meets the required pressure of the liquid product 214. The liquid level of the liquid product drum 120 is maintained by a level control valve 144. The cold liquid product stream 256 then enters pass B5 at the lower end of warm section 160a of the integrated main heat exchanger 106. As the liquid product stream 256 travels upward in pass B5, it exchanges heat with the warm passes A2, C1 and C3 and is warmed to a temperature defined by the liquid product 214 specification as it exits pass B5 at the upper end of the warm section 106a of the integrated main heat exchanger 106. The liquid product 214 is then sent to a production facility. In embodiments, liquid product drum 120 is elevated to a height to get enough NPSHa (net positive suction head available) for the liquid product pump 122 to avoid cavitation damage to the liquid product pump 122.

The external refrigeration system illustrated in FIG. 12 may be the refrigeration system as described in FIG. 10 of this disclosure. In embodiments, the mixed refrigerant compressor 501 of the external refrigeration system and the aforementioned one or more vapor fresh feed compressors 354 may be independently installed within the processing unit 100. Alternatively, the mixed refrigerant compressor 501 and the one or more vapor fresh feed compressors 354 may be integrated into one integrally-geared compressor with the processing unit 100.

Further, a coldbox 146 is designed to contain all low-temperature equipment including the integrated main heat exchanger 106, the first stage cold gas-liquid separator 116, the second stage cold gas-liquid separator 118, the liquid product drum 120, the plurality of fresh feed thermosiphon vessels 352, as well as the associated piping. Control valves 350, 138, 141, 119, 142, and 124 can either be enclosed within or installed outside of the coldbox 146. The coldbox 146 is typically filled with insulation material and purged with nitrogen to provide cold insulation for the low-temperature equipment and parts.

Generally, the above describes an improved process and system for separation of hydrogen from an effluent by dehydrogenation of propane, isobutane, or a mixture of both. More specifically, the use of an integrated heat exchanger allows for a more balanced process reducing off-design, i.e. not allowed for or expected, flow distributions. This provides improved thermodynamic efficiency and stability. Further, an integrated heat exchanger with a compact design takes up less space, which can be a significant benefit in an industrial setting.

Further, the expander configuration with two sets of expanders/compressors improves the process. In the description above, the composition and mass flow of the stream to each set of expander/compressor remains substantially unchanged. This improves the energy benefit by recovering the expander power back to the system. Also, the hydrogen-rich gas in the rectifier is further purified to meet the minimum hydrogen content specification of the flash drum vapor, which in turn improves the $C_3$ liquid product recovery.

Referring to FIG. 12, in embodiments liquid product 214 may mainly comprise propylene and propane, as well as small amounts of lighter components such as hydrogen, methane, ethylene, and ethane. An example of the composition of liquid product 214 is shown in the following Table 1000-1:

TABLE 1000-1

| Components | Mole % | Notes |
|---|---|---|
| Hydrogen | 0.0556 | May be as high as 0.1000% |
| Methane | 0.1413 | |
| Ethylene | 0.0835 | |
| Ethane | 1.7337 | |
| Propylene | 29.5787 | May be as high as 35% |
| Propane | 67.9940 | |
| C4+ Heavy HC | 0.4131 | |
| Total | 100.0000 | |

In embodiments, the light components, such as ethane and all other lighter components, may need to be removed from liquid product 214, which may be accomplished using a deethanizer system 1000 and a propylene/propane splitter system 800. In embodiments, polymer-grade propylene typically comprises a minimum purity of 99.5%-99.8% (mole) propylene and may contain impurities such as methane ethylene, ethane, propane, etc.

Figure 13:
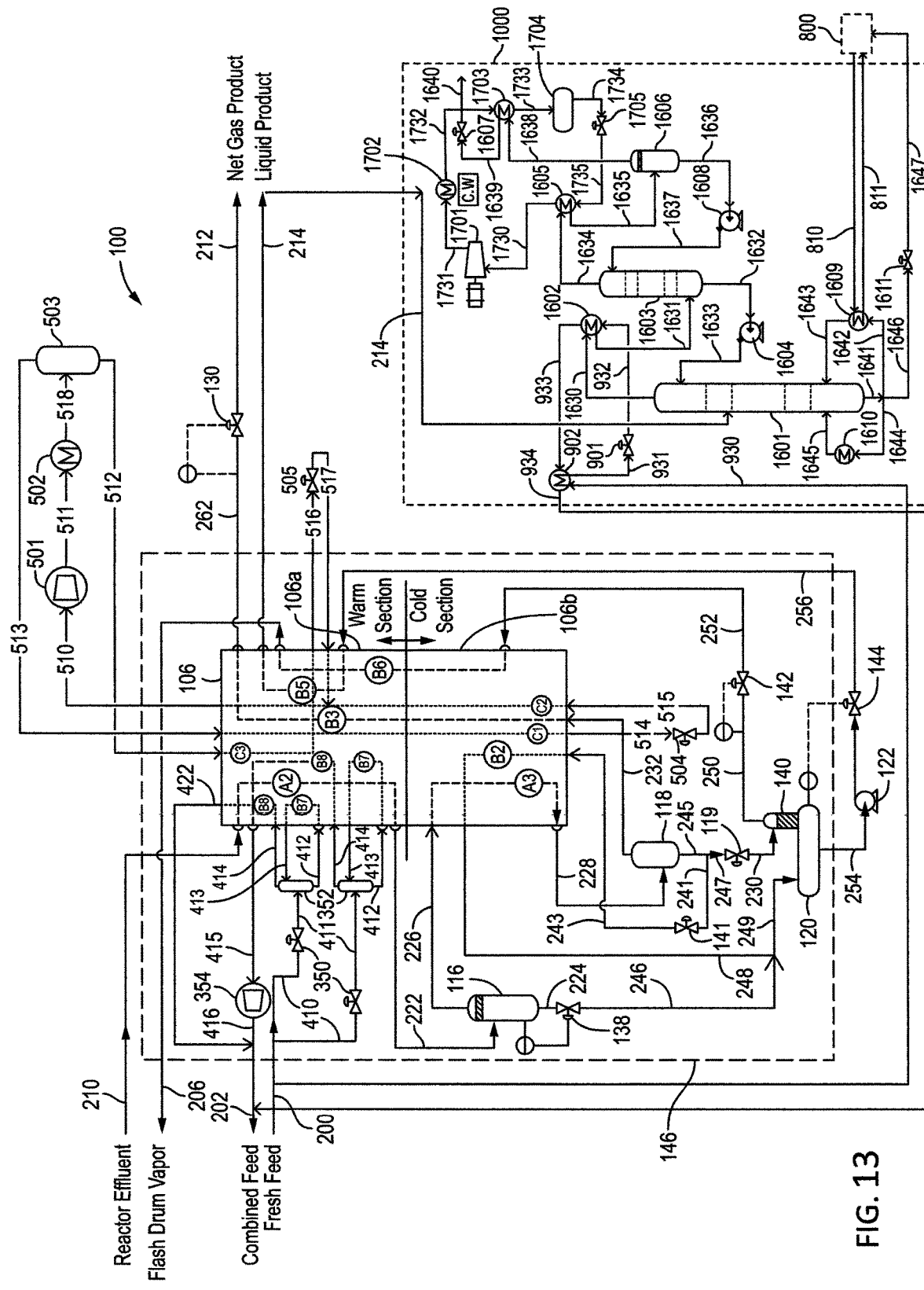
FIG. 13 illustrates an additional embodiment of the separation system of the processing unit shown in FIG. 12, further comprising a deethanizer system and a propylene/propane splitter system.

FIG. 13 illustrates an additional embodiment of the separation system of processing unit 100 shown in FIG. 12, wherein FIG. 13 comprises the deethanizer system 1000 and the propylene/propane splitter system 800.

In embodiments, liquid product 214 may flow to the middle stage of a stripper column 1601. In embodiments, liquid product 214 may have a pressure in a range of between 1,400 kPa·G to 1,600 kPa·G and a temperature in a range of between 30° C. to 45° C. Further, in embodiments, liquid product 214 may comprise mainly propylene and propane, as well as certain amounts of light components such as hydrogen, methane, ethylene, and ethane. An example of a composition of liquid product 214 is shown in Table 1000-1. In embodiments, stripper column 1601 may comprise a tray-type column or a packing-type column. In embodiments, a reflux liquid stream 1633 may be fed into the top stage of stripper column 1601, and reboiling vapor streams 1643 and 1645 may be fed into the bottom stage of stripper column 1601. In embodiments, heat and mass transfers may occur while liquid product 214, reflux liquid stream 1633, and reboiling vapor streams 1643 and 1645 travel into and contact the trays and/or packing inside stripper column 1601, which may form a bottom C3+ hydrocarbon stream 1641 with less than 100 ppm ethane and lighter components. In embodiments, a top vapor stream 1630 may still contain amounts of C3+ hydrocarbons, and therefore, the top vapor stream 1630 may require additional purification and recovery by a rectifier column 1603. In embodiments, the ethane and lighter components in vapor stream 1630 may be significantly enriched with ethane and lighter components greater than 55% (mole).

In embodiments, a fresh feed stream 930, which may be split from the main fresh feed stream 200, may flow to a fresh feed/vapor heat exchanger 902, which may reduce the temperature of the fresh feed stream 930 to about 10° C. to 15° C. In embodiments, this reduction in temperature of the fresh feed stream 930 in heat exchanger 902 may be assisted by a cold fresh feed vapor stream 933. In embodiments, a liquid stream 931 may emerge from heat exchanger 902 and proceed to a control valve 901. In embodiments, the pressure of liquid stream 931 may be reduced by control valve 901, which may result in reducing the pressure of liquid stream 931 to a range of between 250 kP·G to 400 kPa·G (depending on the pressure of the combined feed 202 as required by dehydrogenation unit 102) to become a liquid/vapor mixture stream 932, which may have a temperature ranging from about −10° C. to about 1.5° C. In embodiments, stream 932 may be routed to a stripper column condenser 1602, which may cool the vapor stream 1630. In embodiments, saturated vapor stream 933 may emerge from the stripper column condenser 1602, and saturated vapor stream 933 may proceed to heat exchanger 902 where saturated vapor stream 933 may exchange heat with warm fresh feed stream 930. In embodiments, a vapor stream 934 may emerge from heat exchanger 902, and vapor stream 934 may proceed to combine with combined feed 202.

In embodiments, a vapor stream 1631 may emerge from stripper column condenser 1602 with a temperature of about 0° C. to 5° C., and vapor stream 1631 may partially (around 90%) condense to liquid. In embodiments, stream 1631 may proceed to the bottom of rectifier column 1603, wherein any vapor remaining in stream 1631 may be flashed out. In embodiments, once within the rectifier column 1603, the vapor materials from stream 1631 may travel upwards in the rectifier column 1603 providing stripping to the materials from a liquid stream 1637 fed from the top of the rectifier column 1603, and further, the liquid from stream 1631 may be separated out and combined with the materials from liquid stream 1637 to form a cold reflux stream 1632. In embodiments, cold reflux stream 1632 may proceed to a stripper column reflux pump 1604, wherein cold reflux stream 1632 emerges as stream 1633. In embodiments, stream 1633 may proceed back to the top stage of stripper column 1601.

Returning to stream 1641, in embodiments the C3+ hydrocarbon stream 1641 emerging from the bottom of the stripper column 1601 may be split into three streams: a stream 1642, which may flow to a stripper column main reboiler 1609; a stream 1644, which may flow to a stripper column supplemental reboiler 1610; and a C3+ liquid product stream 1646, which may flow to a pressure control valve 1611, where it may become a stream 1647, which then proceeds to the propylene/propane splitter system 800 (detail not shown) to separate the propylene product.

In embodiments, stream 1641 may have a temperature range of between 25° C. to 35° C. depending on the operation pressure of stripper column 1601, which is typically in a range of between 850 kPa·G to 1150 kPa·G. In embodiments, stream 1642 may be heated by a warm gas stream 810 split from a heat pump compressor (HPC) discharge at the propylene/propane splitter system 800 (detail not shown). In embodiments, the typical temperature of stream 810 may range from between 45° C. to 55° C. In embodiments, stream 810 may be cooled by stream 1642 through the stripper column main reboiler 1609 to a temperature range of 28° C. to 32° C., and a stream 811 may flow to the propylene/propane splitter system 800. In embodiments, stream 1642 may be vaporized in stripper column main reboiler 1609 becoming stream 1643, which may be routed back to the bottom stage of stripper column 1601 to provide stripping to the down-coming liquid from stream 214 and stream 1633. In embodiments, stripper column main reboiler 1609 may be designed to provide 90%-95% of the required reboiling duty of stripper column 1601, while the remaining 5% to 10% of the required reboiling duty may be provided by stripper column supplemental reboiler 1610. In embodiments, this design may provide operation flexibility and stability for the reboiling section of stripper column 1601. In embodiments, the heating medium for stripper column supplemental reboiler 1610 may comprise a temperature greater than 40° C. material, such as the plant cooling water return stream. Alternatively, in other embodiments the heating medium may comprise liquid refrigerant stream 512.

In embodiments, stripper column 1601 may be operated at a pressure ranging from between about 850 kPa·G to about 1150 kPa·G, with a temperature of the top of stripper column 1601 ranging from between −5.0° C. to 5° C. and a temperature of the bottom of stripper column 1601 ranging from between 25° C. to 35° C. In embodiments, this may produce less than about 100 ppm ethane and lighter components in the C3+ product stream 1647.

In embodiments, rectifier column 1603 may operate at about the same pressure as stripper column 1601. In embodiments, rectifier column 1603 may be a tray-type column or a packing-type column, wherein a reflux liquid stream 1637 may flow into the top stage of rectifier column 1603 and further wherein stripping vapor stream 1631 may flow into the bottom stage of rectifier column 1603. In embodiments, heat and mass transferring may occur when the liquid and vapor in rectifier column 1603 travel through and contact the trays or packing inside rectifier column 1603, which may form bottom stream 1632, and overhead vapor stream 1634 composed primarily of ethane and lighter components. In embodiments, overhead vapor stream 1634 may proceed to a rectifier column reflux condenser 1605, where stream 1634 may be cooled to about −36° C. to −32° C. and emerge as a stream 1635. In embodiments, the cooling for stream 1634 may be a result of a refrigerant stream 1735 entering rectifier column reflux condenser 1605. In embodiments, stream 1635 may be partially condensed by rectifier column reflux condenser 1605, and stream 1635 may flow to a rectifier column reflux drum 1606, where the vapor and liquid in stream 1635 may be separated. In embodiments, a liquid stream 1636 may emerge from the bottom of rectifier column reflux drum 1606 and may proceed to a rectifier column reflux pump 1608, after which stream 1636 emerges as stream 1637, which may be pumped back to the top stage of rectifier column 1603. In embodiments, a cold vapor stream 1638 emerging from rectifier column reflux drum 1606 may be C3+ hydrocarbon free and therefore comprise mainly ethane and lighter components. In embodiments, stream 1638 may flow to the refrigerant/gas heat exchanger 1703, where stream 1638 may exchanges heat with a warm refrigerant liquid stream 17323 and may be warmed to a temperature within the range of about 30° C. to 35° C., emerging from heat exchanger 1703 as a stream 1639. In embodiments, the pressure of stream 1639 may be regulated by a pressure control valve 1607 to maintain the system pressure of stripper column 1601 and rectifier column 1603. In embodiments, a discharge stream 1640 from pressure control valve 1607 may be routed to a fuel gas system (not shown).

In embodiments, rectifier column 1603 may be operated at a pressure ranging from about 850 kPa·G to about 1150 kPa·G with a temperature ranging from −36° C. to −32° C. at top of the rectifier column 1603 and a temperature ranging from −5° C. to 5° C. at the bottom of the rectifier column 1603. In embodiments, this may result in about 100% C3+ recovery to C3+ product stream 1647.

In embodiments, the cooling of rectifier column condenser 1605 may be due to a vapor-compression refrigeration system. In embodiments, a refrigeration compressor 1701 may boost a saturated refrigerant vapor stream 1730 from rectifier column reflux condenser 1605 to a high pressure. In embodiments, refrigerant vapor stream 1731 may be condensed to a saturated refrigerant liquid stream 1732 by a refrigerant condenser 1702. In embodiments, refrigerant condenser 1702 may be water cooler or air cooler. In embodiments, stream 1732 may have a temperature ranging from about 30° C. to 50° C. In embodiments, saturated refrigerant liquid stream 1732 may be further cooled by cold vapor stream 1638 in refrigerant/gas heat exchanger 1703 to a subcooled condition and then routed to a refrigerant receiver vessel 1704 as stream 1733. In embodiments, the pressure of a subcooled refrigerant liquid stream 1734 from refrigerant receiver vessel 1704 may be reduced through a thermal-expansion valve 1705, resulting in stream 1735, which may have a cold temperature of about −45° C. to −35° C. through an adiabatic flash evaporation of part of the liquid refrigerant. In embodiments, cold refrigerant stream 1735 may be routed to the rectifier column reflux condenser 1605 to provide refrigeration to rectifier column overhead stream 1634 by vaporizing the cold refrigerant liquid in stream 1735. In embodiments, stream 1735 may totally vaporize in rectifier column reflux condenser 1605, which may result in saturated refrigerant vapor stream 1730, which may be routed to refrigerant compressor 701 for compression.

In embodiments, a suitable refrigerant for the refrigeration system may be propane or propylene. In embodiments, the propane may be charged from fresh feed (propane) stream 200, while the propylene may be charged from propylene product stream from the propylene/propane splitter system 800 (not shown in detail). In embodiments, the refrigeration system may be optimized by adding an economizer (not shown) to lower the compressor energy consumption. Further, in embodiments, the refrigeration compressor 1701 may be a centrifugal type compressor or a screw type compressor.

Figure 14:
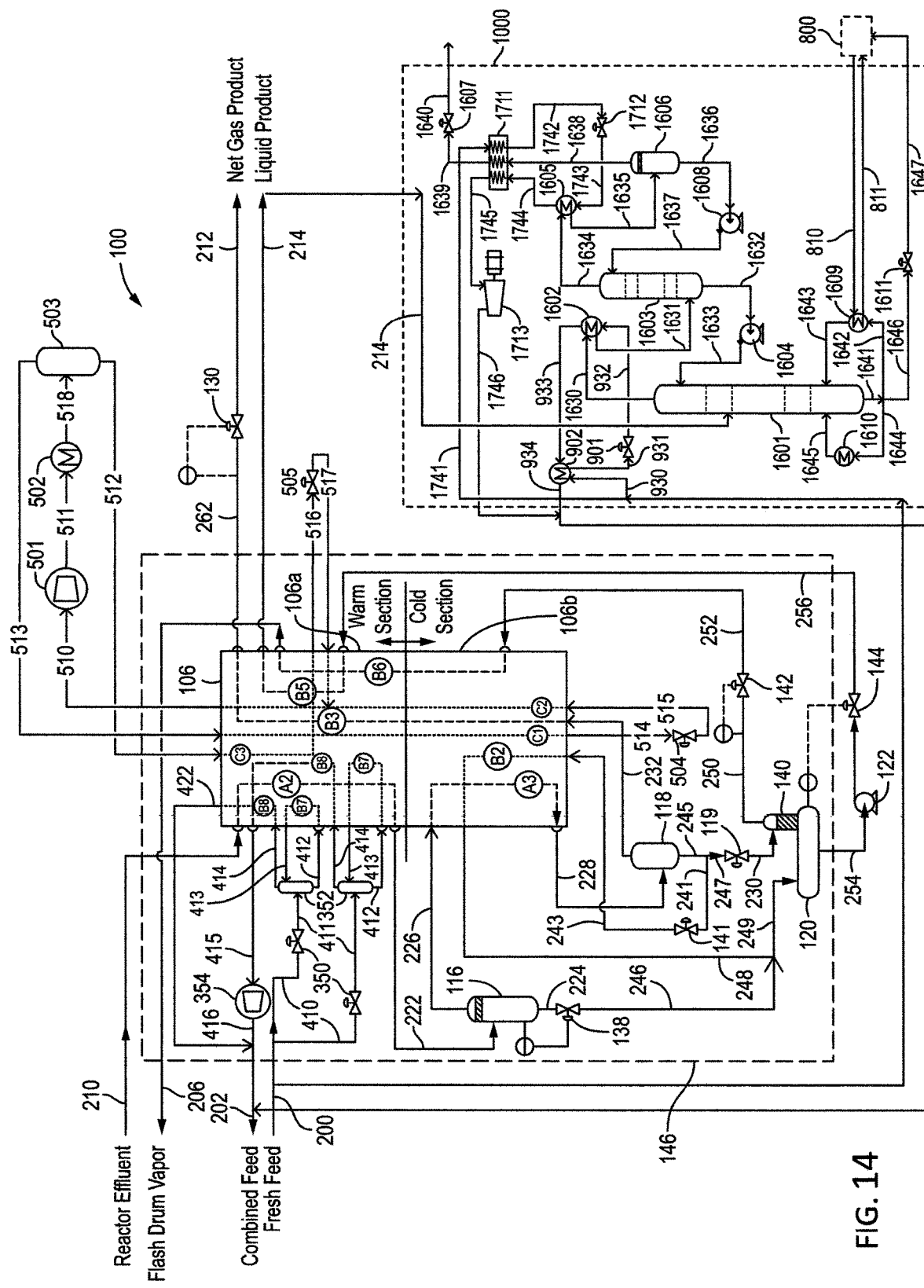
FIG. 14 illustrates an alternative embodiment of a refrigeration process for a rectifier column condenser.

Referring to FIG. 14, in embodiments the vapor-compression refrigeration system for the rectifier column condenser 1605 may alternate to a refrigeration process by flashing a part of fresh feed (propane) stream 200. In embodiments, a fresh feed stream 1741, which may be split from the main fresh feed stream 200, may flow to a fresh feed/gas heat exchanger 1711, which may reduce the temperature of the fresh feed stream 1741 to about −35° C. to −25° C. In embodiments, this reduction in temperature of the fresh feed stream 1741 in heat exchanger 1711 may be assisted by a cold fresh feed vapor stream 1744 and the cold vapor stream 1638. In embodiments, a liquid stream 1742 may emerge from heat exchanger 1711 and proceed to a control valve 1712. In embodiments, the pressure of liquid stream 1742 may be reduced by control valve 1712, which may result in reducing the pressure of liquid stream 1742 to a range of between 10 kP·G to 50 kPa·G (depending on the required temperature of stream 1635) to become a liquid/vapor mixture stream 1743, which may have a temperature ranging about −40° C. to about −35° C. In embodiments, stream 1743 may be routed to the rectifier column condenser 1605, which may cool the vapor stream 1634. In embodiments, saturated vapor stream 1744 may emerge from the rectifier column condenser 1605, and saturated vapor stream 1744 may proceed to heat exchanger 1711 where saturated vapor stream 1744 may exchange heat with warm fresh feed stream 1741. In embodiments, a vapor stream 1745 with a temperature ranging from 30° C. to about 45° C. may emerge from heat exchanger 1711, and vapor stream 1745 may be boosted to a pressure same as stream 934 by a fresh feed vapor booster compressor 1713. In embodiments, a vapor stream 1746 may emerge from the discharge of the fresh feed vapor booster compressor 1713 and proceed to combine with stream 934 and then commingle with the combined feed 202. In embodiments, the fresh feed vapor booster compressor 1713 may comprise a centrifugal type compressor, a screw type compressor, or a reciprocating type compressor.

In embodiments, similar to FIG. 13, cold vapor stream 1638 emerging from rectifier column reflux drum 1606 may be C3+ hydrocarbon free and therefore comprise mainly ethane and lighter components. In embodiments, stream 1638 may flow to the fresh feed/gas heat exchanger 1711, where stream 1638 may exchanges heat with warm fresh feed liquid stream 1741 and may be warmed to a temperature within the range of about 30° C. to 45° C., emerging from heat exchanger 1711 as a stream 1639. In embodiments, the pressure of stream 1639 may be regulated by a pressure control valve 1607 to maintain the system pressure of stripper column 1601 and rectifier column 1603. In embodiments, a discharge stream 1640 from pressure control valve 1607 may be routed to a fuel gas system (not shown).

In embodiments, the fresh feed/vapor heat exchanger 902 and the refrigerant/gas heat exchanger 1703 may be shell/tube type heat exchangers or brazed aluminum plate-fin type heat exchangers (BAHX), and the latter may significantly increase the system thermal efficiency since it can be designed to have an approaching temperature as low as 1.0° C. In embodiments, the fresh feed/gas heat exchanger 1711 may be brazed aluminum plate-fin type heat exchangers (BAHX), and may significantly increase the system thermal efficiency since it can be designed to have an approaching temperature as low as 1.0° C. In embodiments, the stripper column reflux condenser 1602, the stripper column main reboiler 1609, the stripper column supplemental reboiler 1610, and rectifier column reflux condenser 1605 may be shell/tube type heat exchangers, or brazed aluminum plate-fin in kettle (PFK) type heat exchangers, and the latter may significantly increase the system thermal efficiency since it can be designed to have an approaching temperature as low as 1.0° C. to 2.0° C.

In embodiments, the disclosed processes and schemes of the deethanizer system 1000 may operate at lower pressures and temperatures at the columns 1601 and 1603, which may reduce the overall system energy consumption, equipment sizes, and equipment cost compared to the traditional deethanizer system that typically operates at a higher pressure ranging about from 2500 kPa·G to 3000 kPa·G.

In embodiments, the disclosed processes and schemes of the deethanizer system 1000 may operate at a lower pressure and a lower temperature at the bottom of the stripper column 1601, which may enable using lower temperature heating sources for reboilers 1609 and 1610, therefore eliminating low-pressure steam as heating medium, which the tradition deethanizer systems typically uses. In embodiments, lower temperature heating sources such as the HPC discharge stream, the MR liquid stream 512, and/or a plant cooling water return stream may be used as heating mediums for the reboilers 1609 and 1610.

In embodiments, the elimination of low-pressure steam as a heating source in the disclosed process and schemes of the deethanizer system 1000 may reduce the steam consumption by 0.55 metric tons per metric ton of propylene production. This is therefore a significant reduction of plant CO2 emissions given the steam is typically produced by burning fossil fuels.

What is claimed is:

1. A deethanizer system for separating ethane and other components from a liquid mixture comprising propylene and propane hydrocarbon components as well as ethane and lighter components, comprising:
   a stripper column section comprising:
      a stripper column, wherein the stripper column comprises a top stage and a bottom stage, and further wherein the stripper column receives a liquid mixture; and
      a stripper column condenser, wherein the stripper column condenser is connected to the stripper column and a first heat exchanger, wherein the first heat exchanger transfers a fresh feed (propane) liquid stream to a first control valve, wherein the first control valve transfers a mixed vapor/liquid stream to the stripper column condenser; and
   a rectifier column section comprising:
      a rectifier column, wherein the rectifier column is connected to the stripper column condenser;
      a rectifier column reflux condenser, wherein the reflux condenser is connected to the rectifier column;
      a refrigeration compressor, wherein the refrigeration compressor is connected to the rectifier column reflux condenser;
      a rectifier column reflux drum, wherein the rectifier column reflux drum is connected to the rectifier column reflux condenser;
      a refrigerant condenser, wherein the refrigerant condenser is connected to the refrigeration compressor;
      a refrigerant/gas heat exchanger, wherein the refrigerant/gas heat exchanger is connected to the refrigerant condenser, and further wherein the refrigerant/gas heat exchanger receives a cooled vapor stream from the rectifier column reflux drum;

a refrigerant receiver vessel, wherein the refrigerant receiver vessel is connected to the refrigerant/gas heat exchanger; and a thermal expansion valve, wherein the thermal expansion valve is connected to the refrigerant receiver vessel, and further wherein the thermal expansion valve provides a cooled refrigerant stream to the rectifier column reflux condenser;

wherein, the deethanizer system is connected to a propylene/propane splitter system.

2. The deethanizer system of claim 1, wherein the refrigerant/gas heat exchanger transfers a discharge stream to a fuel gas system.

3. The deethanizer system of claim 2, wherein the refrigerant/gas heat exchanger transfers a discharge stream to a fuel gas system through a pressure control valve.

4. The deethanizer system of claim 1, wherein the rectifier column reflux drum transfers a liquid stream back to the rectifier column.

5. The deethanizer system of claim 4, wherein the rectifier column reflux drum transfers the liquid stream back to the rectifier column through a rectifier column reflux pump.

6. The deethanizer system of claim 1, wherein the first heat exchanger discharges a vapor stream, and further wherein the first heat exchanger receives a fresh feed stream and a fresh feed vapor stream.

7. The deethanizer system of claim 6, wherein the first heat exchanger reduces the temperature of the fresh feed stream.

8. The deethanizer system of claim 7, wherein the stripper column condenser is cooled by the fresh feed stream, wherein the fresh feed stream comprises a temperature of between −10 degrees C. and 5 degrees C.

9. The deethanizer system of claim 1, wherein the bottom stage of the stripper column discharges a hydrocarbon stream, wherein the hydrocarbon stream is split into a first stream, a second stream, and a third stream.

10. The deethanizer system of claim 9, wherein the first stream flows to a stripper column main reboiler, wherein the stripper column main reboiler vaporizes the first stream, and further wherein the stripper column main reboiler sends the vaporized first stream to the bottom stage of the stripper column.

11. The deethanizer system of claim 10, wherein the stripper column main reboiler provides a reboiler stream to the propylene/propane splitter system, and further wherein the propylene/propane splitter system provides a warmed gas stream to the stripper column main reboiler, and further wherein the warmed gas stream comprises a temperature between 45 degrees C. and 50 degrees C.

12. The deethanizer system of claim 9, wherein the second stream flows to a stripper column supplemental reboiler, wherein the stripper column supplemental reboiler vaporizes the second stream by employing a lower temperature heating source stream with a temperature of between 35 degrees C. and 50 degrees C., and further wherein the stripper column supplemental reboiler sends the vaporized second stream to the bottom stage of the stripper column.

13. The deethanizer system of claim 9, wherein the third stream flows to a pressure control valve.

14. The deethanizer system of claim 13, wherein the third stream flows from the pressure control valve to the propylene/propane splitter system.

15. The deethanizer system of claim 1, wherein the system operates at a pressure range between 850 kPa·G and 1150 kPa·G.

16. The deethanizer system of claim 1, wherein the rectifier column discharges a reflux stream.

\* \* \* \* \*